United States Patent
Jeong et al.

(10) Patent No.: US 11,697,104 B2
(45) Date of Patent: Jul. 11, 2023

(54) METHOD FOR PREPARING, IN SITU, METAL-ORGANIC FRAMEWORK BY USING CONTROL OF DIFFUSION WITHIN IONIC POLYMER

(71) Applicant: DAEGU GYEONGBUK INSTITUTE OF SCIENCE AND TECHNOLOGY, Dalseong-Gun Daegu (KR)

(72) Inventors: Nak Cheon Jeong, Dalseong-Gun Daegu (KR); Jeong Ho Lim, Dalseo-Gu Daegu (KR); Eun Ji Lee, Yangsan-si (KR)

(73) Assignee: DAEGU GYEONGBUK INSTITUTE OF SCIENCE AND TECHNOLOGY, Dalseong-Gun Daegu (KR)

( * ) Notice: Subject to any disclaimer, the term of this patent is extended or adjusted under 35 U.S.C. 154(b) by 252 days.

(21) Appl. No.: 16/954,142

(22) PCT Filed: Dec. 28, 2018

(86) PCT No.: PCT/KR2018/016894
§ 371 (c)(1),
(2) Date: Jun. 16, 2020

(87) PCT Pub. No.: WO2019/135565
PCT Pub. Date: Jul. 11, 2019

(65) Prior Publication Data
US 2021/0162369 A1    Jun. 3, 2021

(30) Foreign Application Priority Data

Jan. 2, 2018  (KR) .................. 10-2018-0000424
Jan. 15, 2018 (KR) .................. 10-2018-0005245

(51) Int. Cl.
*B01J 20/22* (2006.01)
*B01J 20/26* (2006.01)
(Continued)

(52) U.S. Cl.
CPC ............ *B01J 20/226* (2013.01); *B01D 15/08* (2013.01); *B01J 20/267* (2013.01);
(Continued)

(58) Field of Classification Search
None
See application file for complete search history.

(56) References Cited

U.S. PATENT DOCUMENTS 4,781,977 A  *  11/1988  Yagi ................... C08B 37/0012
                                                      428/332
8,764,887 B2     7/2014  Dinca et al.
(Continued)

FOREIGN PATENT DOCUMENTS

| CN | 105498695 A | 4/2016 |
|---|---|---|
| WO | WO 2016-100847 A2 | 6/2016 |
| WO | WO 2017-083467 A1 | 5/2017 |

OTHER PUBLICATIONS

International Search report dated Apr. 10, 2019 for PCT/KR2018/016894 together with the English translation, 7 pages.
(Continued)

*Primary Examiner* — Daniel Berns
(74) *Attorney, Agent, or Firm* — Harness, Dickey & Pierce, P.L.C.

(57) ABSTRACT

Disclosed is a method for preparing a matrix containing metal-organic frameworks (MOFs), comprising the steps of: 1) mixing an organic ligand precursor solution and an anionic polymer-containing solution to produce a mixed solution; and 2) adding a metal salt to the mixture solution. In addition, the present disclosure provides a matrix containing MOFs prepared according to the preparation method, and an adsorbent comprising the same. Furthermore, a
(Continued)

method for performing fluid separation by using a matrix containing MOFs prepared according to the preparation method is disclosed.

15 Claims, 29 Drawing Sheets

(51) Int. Cl.
<table>
<tr><td>B01J 20/28</td><td>(2006.01)</td></tr>
<tr><td>B01J 20/30</td><td>(2006.01)</td></tr>
<tr><td>B01J 20/32</td><td>(2006.01)</td></tr>
<tr><td>C07F 1/08</td><td>(2006.01)</td></tr>
<tr><td>C07F 3/06</td><td>(2006.01)</td></tr>
<tr><td>C08J 3/02</td><td>(2006.01)</td></tr>
<tr><td>C08J 3/21</td><td>(2006.01)</td></tr>
<tr><td>C08K 9/08</td><td>(2006.01)</td></tr>
<tr><td>C08L 1/02</td><td>(2006.01)</td></tr>
<tr><td>C08L 5/04</td><td>(2006.01)</td></tr>
<tr><td>B01D 15/08</td><td>(2006.01)</td></tr>
</table>

(52) U.S. Cl.
CPC ..... *B01J 20/28023* (2013.01); *B01J 20/3085* (2013.01); *C07F 1/08* (2013.01)

(56) References Cited

U.S. PATENT DOCUMENTS

<table>
<tr><td>9,114,348 B2</td><td>8/2015</td><td>Hafizovic et al.</td></tr>
<tr><td>2011/0052650 A1</td><td>3/2011</td><td>Morris et al.</td></tr>
<tr><td>2015/0367294 A1</td><td>12/2015</td><td>Kharul et al.</td></tr>
</table>

OTHER PUBLICATIONS

Denny, Jr. et al., "In Situ Modification of Metal-Organic Frameworks in Mixed-Matrix Membranes", Angew. Chem. Int. Ed., 2015, vol. 54, pp. 9029-9032.

Hu et al., "Alginate hydrogel: A shapeable and versatile platform for in situ preparation of metal-organic framework-polymer composites", ACS Applied Materials & Interfaces, 2016, vol. 8, pp. 17395-17401; DOI: 10.1021 /acsami.6b04505.

\* cited by examiner

Method A: Ligand-distribution (LD) *in situ* synthesis

MOF-polymer
egg-shaped sphere

Method B: Metal ion-distribution (MD) *in situ* synthesis

MOF-polymer
mixed matrix sphere

○ Na$^+$   ⊘ M$^{2+}$ = Cu$^{2+}$ or Zn$^{2+}$   ⌇ Alginate polymer chain
● Ca$^{2+}$   ⌂ L$^{n-}$ = BTC$^{3-}$ or DOBDC$^{4-}$   ◇ MOF = HKUST-1 or MOF-74(Zn)

Side view

Top view

Bottom view

Side view

Top view

Bottom view

Near surface

Far from surface

Core region

Methylene blue

Rhodamine 6G

METHOD FOR PREPARING, IN SITU, METAL-ORGANIC FRAMEWORK BY USING CONTROL OF DIFFUSION WITHIN IONIC POLYMER

The present application is the U.S. National Stage of International Application No. PCT/KR2018/016894, filed Dec. 28, 2018, which claims the benefit of Korean Application Nos. 10-2018-0000424, filed Jan. 2, 2018, and 10-2018-0005245, filed Jan. 15, 2018, the contents of which are hereby incorporated by reference in their entireties.

TECHNICAL FIELD

The present disclosure provides a method for preparing a metal-organic framework (MOF)-containing matrix using an anionic polymer; a matrix prepared by the method; an adsorbent including the matrix; and a method for separating fluid using the matrix.

BACKGROUND ART

Metal-organic frameworks (MOFs) are porous materials that form a two-dimensional (2D) or three-dimensional (3D) framework by multiple links of coordination bonds between inorganic nodes (metal ions or metal oxide clusters) and multitopic organic linkers, and are referred to as "porous coordination polymers" or "porous organic-inorganic hybrid materials". The MOFs have empty coordination sites in a center of a metal as well as well-defined pores, and are used to capture or separate guest molecules. Accordingly, the MOFs are applicable to adsorbents, gas storage materials, chemical material separation, sensors, membranes, functional thin films, drug delivery materials, redox chemical materials, heterogeneous catalysts, catalyst carriers, and the like, and thus MOFs have been actively studied recently.

Recently, an interest in fabrication of MOFs in the form of mixed matrices (MMs) is increasing. In particular, MOF-polymer MMs using environmentally friendly polymers are extremely promising in fields of molecular sorption, chemical separation, and chemical sensing, and global demands for the MOF-polymer MMs are rapidly increasing.

Conventionally, as a method of fabricating a MOF-polymer MM, a post-fabrication method has been proposed, which includes preparing MOF and then mixing the prepared MOF crystals with a polymer to form a matrix (Michael S. Denny, Jr. et al., Angew. Chem. Int. Ed. 2015, 54, 9029-9032). However, the post-fabrication method has a few issues, for example, an inhomogeneous dispersion of MOF particles in a polymer matrix, and a poor adhesion and contact between MOF crystals and the polymer matrix. In particular, molecules may be adsorbed or may pass through a void between the MOF crystals and the polymer matrix, which may cause a decrease in selectivity of a material based on a size of a window included in MOFs. Also, MOF crystals need to be grown first, however, a period of 10 hours or greater and heating at 100° C. are required to grow the MOF crystals, which greatly reduces convenience in a process (Zhonghua Zhu et al., ACS Appl. Mater. Interfaces 2016, 8, 32041-32049).

Furthermore, MOF crystals are grown to have a crystal structure having a window with a constant size. If the sizes of windows in MOF crystals in a MOF-polymer MM are not uniform, the non-uniformity of the sizes causes a decrease in selectivity of separation materials based on the size of the window.

Thus, there is a need for a MOF-polymer mixed matrix in which MOF crystals are uniformly dispersed, in which selectivity of a material to be separated is increased due to a uniform size of a window in MOF crystals and which has excellent adhesion between MOF crystals and a polymer. Also, there is a need for a method for preparing the MOF-polymer mixed matrix through a simple process within a relatively short period of time.

In an effort to solve the above issues, the present inventors have found that it is possible to prepare a MOF-polymer MM in a relatively short period of time without a heating process wherein the crystals of said MOF are uniformly dispersed in the matrix and said MM has extremely excellent adhesion between a polymer and ligands, by mixing an ionic polymer and ligands and then diffusing metal salts in the resulting mixture, instead of using a method of generating MOF crystals and then mixing the MOF crystals with a polymer.

Prior Art Documents (Non-Patent Document 1) Michael S. Denny, Jr. et al., Angew. Chem. Int. Ed. 2015, 54, 9029-9032
(Non-Patent Document 2) Zhonghua Zhu et al., ACS Appl. Mater. Interfaces 2016, 8, 32041-32049

DETAILED DESCRIPTION OF THE INVENTION

Technical Subject

An aspect of the present disclosure provides a method for preparing a matrix containing metal-organic frameworks (MOFs), the method including steps of: 1) mixing an organic ligand precursor solution and an anionic polymer-containing solution to produce a mixed solution; and 2) adding a metal salt to the mixed solution.

Another aspect of the present disclosure provides a matrix containing MOFs prepared by said method.

Still another aspect of the present disclosure provides an adsorbent including said matrix containing MOFs.

A further aspect of the present disclosure provides a method for separating first fluid having a first single molecule size V1 or second fluid having a second single molecule size V2 from a fluid mixture including the first fluid and the second fluid (provided that V1≠V2), the method including the step of: passing the fluid mixture through a matrix containing MOFs prepared by the method for preparing the matrix containing MOFs, wherein the MOFs have an adsorption property or a window size that allows the first fluid to pass and does not allow the second fluid to pass therethrough.

Technical Solution

To achieve the aspects, a first aspect of the present disclosure provides a method for preparing a matrix containing MOFs, including steps of: 1) mixing an organic ligand precursor solution and an anionic polymer-containing solution to produce a mixed solution; and
2) adding a metal salt to the mixed solution.

A second aspect of the present disclosure provides a matrix containing MOFs prepared by the method.

A third aspect of the present disclosure provides an adsorbent including the matrix containing MOFs.

A fourth aspect of the present disclosure provides a method for separating first fluid having a first single molecule size V1 or second fluid having a second single molecule size V2 from a fluid mixture including the first fluid and the second fluid (provided that V1≠V2), The method includes a step of passing the fluid mixture through a matrix containing MOFs prepared by the method according to the first aspect, and MOFs have an adsorption property or a window size that allows the first fluid to pass and does not allow the second fluid to pass therethrough.

Hereinafter, each example embodiment of the present specification will be described in detail.

The term "MOF(s)" used herein is a succession or repetition of structural units including a metal node and an organic linker, and refers to a network framework formed through multiple links of the structural units. Here, the metal node is formed by a bond between metal ions or a bond between metal and oxygen, and the organic linker is a ligand that is typically coordinated to a coordination site of the metal node. The structural units refer to cages with nano-sized pores, and the cages are alternately interconnected to share a window. Thus, the MOF may have a 2D or 3D structure including one or more types of cages and one or more windows.

The term "a MOF(s)-containing matrix" or "a matrix containing MOFs" used herein refers to a matrix including a polymer and MOFs dispersed therein, and the polymer is in the form of a continuous polymer matrix.

A conventional MOF-containing matrix is prepared by a post-fabrication method which includes preparing MOF crystals and then dispersing the crystals in a polymer solution to fabricate a matrix. However, in the post-fabrication method, it is difficult to uniformly disperse the MOF crystals in the matrix because the crystals settle down in the polymer solution. Also, adhesion between the crystals and a polymer decreases due to a low interaction therebetween, and selectivity of fluid adsorption through the MOF is reduced because a molecule passes through a void therebetween. In addition, in the post-fabrication method, a heating process is required and a relatively long period of time is taken to generate MOF crystals, which may cause an inconvenience in a process. Thus, the present inventors have found that it is possible to prepare a matrix containing MOFs with enhanced adhesion between the polymer and MOFs, by dispersing organic ligands first in an ionic polymer so that MOF crystals can be uniformly dispersed in comparison to the post-fabrication method. The disclosure of the present specification is based on the above finding.

The term "ionic polymer" used herein refers to a polymer with a moiety or a functional group representing positive or negative charges. Preferably, the ionic polymer may be an anionic polymer. Non-limiting examples of the anionic polymer may include alginate, carboxymethyl cellulose, hyaluronic acid or a combination thereof, and poly(acrylic acid) (PA) and its derivatives, poly(methyl acrylate) (PMA) and its derivatives, poly(thiophene acetic acid) and its derivatives, poly(sulfonate styrene) (PSS) and its derivatives, or a combination thereof may also be available. Also, a substitute polymer having anionic polymer-like properties may be available. For example, an anionic cellulose microfiber such as TEMPO-oxidized cellulose nanofibers (TOCN) may be available.

An anionic functional group of the anionic polymer may be a carboxyl group (—COO—), a sulfonic acid group (—SO3-), or an acetoxy group (—CH2COO—). The anionic polymer may be provided in a form of a salt, and may be provided in a form of, for example, a metal salt binding to a metal ion such as a sodium ion.

An organic ligand precursor mentioned herein may be an organic ligand compound having at least two sites capable of binding to a metal ion of a metal salt. Specifically, the organic ligand precursor may be an organic ligand compound having at least two coordination sites for coordinate bonding to a metal ion in one molecule. The organic ligand precursor may be, but is not limited to, 1,4-benzenedicarboxylic acid (BDCA), isophthalic acid, 1,3,5-benzenetricarboxylic acid (BTCA), 2,5-dihydroxyterephthalic acid, 2-aminoterephthalic acid, 2-nitroterephthalic acid, 2-methylterephthalic acid, 2-haloterephthalic acid, azobenzene tetracarboxylic acid, 1,3,5-tri(4-carboxyphenyl)benzene, 2,6-naphthalene dicarboxylic acid (NDCA), benzene-1,3,5-tribenzoic acid (BTB), fumaric acid, glutaric acid, 2,5-furanedicarboxylic acid (FDCA), 1,4-pyridinedicarboxylic acid, 2-methylimidazole, alkyl-substituted imidazole, aromatic ring substituted imidazole, 2,5-pyrazinedicarboxylic acid, 1,4-benzene dipyrazole, 3,5-dimethyl-pyrazolate-4-carboxylate, 4-(3,5-dimethyl-1H-pyrazol yl)benzoate, 1,4-(4-bispyrazolyl) benzene, deprotonated 2-methylimidazole, 4,4'-biphenyldicarboxylic acid, 1,3,6,8-tetrakis(p-benzoic acid)pyrene, tetrakis(4-carboxyphenyl)porphyrin, 1,1'-biphenyl-3,3',5,5'-tetracarboxylic acid, N,N,N',N'-tetrakis(4-carboxyphenyl)-biphenyl-4,4'-diamine (TCBTDA), derivatives thereof, or a combination thereof. Specifically, the organic ligand precursor may be a bulky ligand including one or more benzene rings, preferably two or three or more benzene rings. For example, 1,4-benzenedicarboxylic acid, 1,3,5-benzenetricarboxylic acid, 2,5-dihydroxyterephthalic acid, 2,6-naphthalene dicarboxylic acid, azobenzene tetracarboxylic acid or derivatives thereof may be used, but is not limited thereto. By adjusting the organic ligand precursor, a pore size, a shape and a chemical condition of a finally generated MOF may be changed.

Step 1) may further include step 1-1) of adding a crosslinkable metal salt to the mixed solution. The crosslinkable metal salt may bind to an ionic polymer to crosslink the ionic polymer. The crosslinkable metal salt may crosslink the anionic polymer via an electrostatic bond. The crosslinkable metal salt may provide divalent or trivalent metal cations, and may be, but is not limited to, $Ca^{2+}$, $Fe^{2+}$, $Zn^{2+}$, $Mn^{2+}$, $Cu^{2+}$, $Mg^{2+}$, $Sr^{2+}$, $Co^{2+}$, $Ni^{2+}$, $Sc^{2+}$, $Ti^{4+}$, $V^{2+}$$Cr^{2+}$, $Fe^{3+}$, $Y^{3+}$, $Zr^{4+}$, $Nb^{3+}$, $Mo^{2+}$, $Tc^{2+}$, $Ru^{2+}$, $Rh^{3+}$, $Pd^{2+}$, $Cd^{2+}$, and the like. Divalent or trivalent additional transition metals may also be available. The anionic polymer may cause an electrostatic repulsion with a negatively charged ligand, but a stable matrix form may be formed by the crosslinkable metal salt. In an example embodiment of the present invention, $Ca(NO_3)_2$ is used as a crosslinkable metal salt and it is observed that white spherical solids are formed immediately after $Ca(NO_3)_2$ is added. The above step of adding the crosslinkable metal salt may be performed for 5 minutes (min) to 60 min such that ions may be sufficiently exchanged.

In an example embodiment of the present invention, alginate is used as an anionic polymer. Alginic acid (H+ALG) is a linear copolymer wherein (1-4)-linked β-D-mannuronate (M) and its C-5 epimer α-L-guluronate (G) are covalently linked in random sequences (MG-blocks) or block forms (M-block and G-block). The H+ALG contains carboxylic acids, where the protons of carboxylic acids can be substituted by alkali metals, alkali earth metals or transition metals. For example, the H+ALG may be readily converted to sodium alginate (Na+ALG), and homopolymeric linear Na+ALG chains may be crosslinked when Na+ ions are exchanged with divalent metal ions such as $Ca^{2+}$, $Mg^{2+}$, $Cu^{2+}$ and $Zn^{2+}$. Accordingly, the alginate may be easily crosslinked by a reaction with the crosslinkable metal salt of the present invention, and thus may be used as an anionic polymer in the present example embodiment. Also, alginate (ALG) that is an anionic form of H+ALG is an environmentally friendly polymer, and may be widely used in various fields such as food, medical, pharmaceutical and chemical industries. The alginate is attracting attention as a very environmentally friendly material because the alginate has biocompatibility and may be easily decomposed even when disposed. Accordingly, in an example embodiment of the present invention, the alginate may be used as an anionic polymer, and it is confirmed that a matrix containing MOFs prepared using the alginate as a matrix polymer has an extremely excellent characteristic.

The organic ligand precursor solution may include a basic material. The basic material may be a weak basic material having a pKb value of 3 to 6, and may be, for example, organic amine, specifically, triethylamine (TEA), trimethylamine, tripropylamine, or 1,4-diazabicyclo[2.2.2]octane (DABCO). The basic material may be an amide or imidazole-based material. In an example embodiment of the present invention, triethylamine (TEA) is used. A deprotonation process of an organic ligand material is required in generation of MOF crystals, and in the conventional post-fabrication method, a heating process at a high temperature of 100° C. or higher is required for the deprotonation, thereby reducing a convenience in a process. In the present example embodiment, it is confirmed that it is possible to easily generate MOF crystals without the heating process by deprotonating an organic ligand material using the weak basic material.

Step 1) may be performed at room temperature of 20 to 25° C. Since the heating process is not required as described above, a reaction may be performed at room temperature, thereby increasing a convenience in a process.

In steps 1) and 1-1), any solvent capable of dissolving the anionic polymer, the organic ligand precursor, the flexible polymer, and the crosslinkable metal salt may be used as a solvent of each step, and a mixture of two or more solvents may also be used. Specifically, the solvent may be at least one selected from the group consisting of methanol, ethanol, propanol, isopropanol, butanol, N,N-dimethylformamide (DMF), N,N-diethylformamide (DEF), acetonitrile, chloroform, normal hexane (n-Hexane), benzene, toluene, xylene, diethyl ether, acetone, and water. More specifically, the solvent may be ethanol, acetonitrile, water, or a combination thereof.

To sufficiently disperse organic ligands of step 1 in a matrix, a step of immersing a matrix formed in step 1) or 1-1) in the organic ligand solution may be further included. The step of immersing the matrix in the organic ligand solution may be repeatedly performed an appropriate number of times, for example, three times.

Step 2) is a step of forming a MOF by adding a metal salt to the mixed solution of step 1).

The metal salt may be a typically used metal ion-containing metal ion compound, and may be, but is not limited to, for example, a metal inorganic acid salt such as metal nitrate, metal sulfate, metal phosphate or metal hydrochloride, or a hydrate thereof. For example, the metal salt may be metal nitrate or a hydrate thereof. Here, the metal may be at least one metal selected from the group consisting of copper (Cu), zinc (Zn), iron (Fe), nickel (Ni), zirconium (Zr), chromium (Cr), scandium (Sc), cobalt (Co), titanium (Ti), manganese (Mn), vanadium (V), aluminum (Al), magnesium (Mg), gallium (Ga), indium (In), yttrium (Y), niobium (Nb), molybdenum (Mo), technetium (Tc), ruthenium (Ru), rhodium (Rh), palladium (Pd), silver (Ag), and cadmium (Cd). For example, the metal salt may be a metal salt of a metal ion with divalent or trivalent charges derived from the metal.

A molar ratio of the metal salt to the organic ligand precursor may range from 1:20 to 20:1, and more specifically, from 5:1 to 10:1. The molar ratio of the metal salt to the organic ligand precursor in the MOF may be properly selected based on a type of metal salts and organic ligand precursors that are used.

A metal ion dissociated from a metal salt may be exchanged with a metal ion that is in a form of a metal salt together with the anionic polymer in step 1), or with the crosslinkable metal salt added in step 1-1). The exchanged metal ion may bind to organic ligands that are already distributed around, to form MOF crystals. Unlike the conventional post-fabrication method of preparing a MOF and then of dispersing the MOF in a polymer matrix, in the method of the present invention, MOF crystals may be generated within a relatively short period of time even though ligands are dispersed in a matrix and a metal ion is added thereto. Specifically, in an example embodiment of the present specification, it is confirmed that MOF crystals are generated when 5 min elapsed after a metal salt was added (FIG. 4). Also, it is confirmed that MOF crystals are uniformly formed in both a surface and a core region of a sphere.

The anionic polymer of the present invention may properly disperse negatively charged organic ligands in a matrix through a negatively charged functional group. A metal ion of the crosslinkable metal salt may function to connect the anionic polymer and organic ligands, and accordingly the organic ligands may be uniformly dispersed within a polymer. When the metal ion added in step 2) is exchanged with a metal ion dissociated from the crosslinkable metal salt, the exchanged metal ion is uniformly dispersed because the metal ion dissociated from the crosslinkable metal salt is uniformly dispersed already in the matrix (FIG. 14). Thus, generated MOF crystals may also be uniformly dispersed. In other words, unlike the post-fabrication method with a difficulty of uniformly dispersing crystals in a matrix because the crystals sink, crystals may be generated after ligands are dispersed, thereby preparing MOFs such that the MOFs are uniformly distributed.

Step 2) may be performed at room temperature of 20 to 25° C. Since the heating process is not required as described above, a reaction may be performed at room temperature. Thus, a convenience in a process may increase and energy may not need to be consumed.

Step 2) may be performed for 5 min to 60 min. In the method of the present invention, it is possible to generate a crystal structure within a relatively short period of time, unlike a conventional MOF crystal generation method.

As a solvent of the solution of step 2), any solvent capable of dissolving the metal salt may be used, and at least two solvents may be mixed and used. Specifically, the solvent may be at least one selected from the group consisting of methanol, ethanol, propanol, isopropanol, butanol, N,N-dimethylformamide (DMF), N,N-diethylformamide (DEF), acetonitrile, chloroform, normal hexane (n-Hexane), benzene, toluene, xylene, diethyl ether, acetone, and water. More specifically, the solvent may be ethanol, acetonitrile, water, or a combination thereof.

The MOF prepared by the method of the present disclosure may include a structure unit represented by the following Chemical Formula 1:

$$[M_x(L)_y] \qquad \text{[Chemical Formula 1]}$$

wherein M may be, for example, at least one metal selected from the group consisting of copper (Cu), zinc (Zn), iron (Fe), nickel (Ni), zirconium (Zr), chromium (Cr), scandium (Sc), cobalt (Co), titanium (Ti), manganese (Mn), vanadium (V), aluminum (Al), magnesium (Mg), gallium (Ga), indium (In), yttrium (Y), niobium (Nb), molybdenum (Mo), technetium (Tc), ruthenium (Ru), rhodium (Rh), palladium (Pd), silver (Ag) and cadmium (Cd), L may be, for example, at least one organic metal ligand selected from the group consisting of 1,4-benzenedicarboxylate (BDC), 2,5-dihydroxyterephthalate (DOBDC), 1,3,5-benzenetricarboxylate (BTC), 1,1'-biphenyl-3,3',5,5'-tetracarboxylate (BPTC), N,N,N',N'-tetrakis(4-carboxyphenyl)-biphenyl-4,4'-diamine (TCBTDA), isophthalate, 2-aminoterephthalate, 2-nitroterephthalate, 2-methylterephthalate, 2-haloterephthalate, azobenzene tetracarboxylate, 1,3,5-tri(4-carboxyphenyl)benzene, 2,6-naphthalene dicarboxylate (NDC), benzene-1,3,5-tribenzoate (BTB), fumarate, glutarate, 2,5-furanedicarboxylate (FDC), 1,4-pyridinedicarboxylate, 2-methylimidazole, alkyl-substituted imidazole, aromatic ringsubstituted imidazole, 2,5-pyrazinedicarboxylate, 1,4-benzene dipyrazole, 3,5-dimethyl-pyrazolate carboxylate, 4-(3,5-dimethyl-1H-pyrazol-4-yl)benzoate, 1,4-(4-bispyrazolyl) benzene, deprotonated 2-methylimidazole, 4,4'-biphenyldicarboxylate, 1,3,6,8-tetrakis(p-benzoic acid)pyrene, and tetrakis(4-carboxyphenyl) porphyrin, x denotes an integer of 2 to 6, and y denotes an integer of 2 to 12.

Specifically, the MOF may include a structure unit represented by [Cu3(BTC)2], [Cu2(BDC)2], [Zn3(BTC)2], [Zn2(BDC)2], [Fe3(BTC)2], [Fe2(BDC)2], [Ni3(BTC)2], or [Ni2(BDC)2]. Here, a 3D MOF represented by [Cu3(BTC)2] is typically referred to as "HKUST-1" (see "A Chemically Functionalizable Nanoporous Material [Cu3(TMA)2(H2O)3]n", Chui, S. S.-Y; Lo, S. M.-F.; Charmant, J. P. H.; Orpen, A. G.; Williams, I. D. Science 1999, 283, 1148-1150), and a 2D MOF represented by [Cu2(BDC)2] is referred to as "MOF-2. Also, a 3D MOF represented by [Zn(BTC)2], is referred to as "Zn-HKUST-1".

MOFs may be included in an amount of approximately 10 to approximately 50 wt % based on the total weight of the matrix containing MOFs of the present disclosure. Specifically, the MOFs may be included in an amount of approximately 20 to approximately 45 wt %, and more specifically in an amount of approximately 30 to approximately 40 wt %, but there is no limitation thereto.

In the method of the present disclosure, organic ligands are dispersed in the anionic polymer and then metal ions are added to perform a reaction (metal ion-diffusion route; route B of FIG. 1). A method of dispersing metal ions in the anionic polymer and then adding ligands to perform a reaction (ligand-diffusion route; route A of FIG. 1) may also be performed in a different order from that of the present invention, however, it is observed that MOFs are generated on only a surface of a sphere when the same reaction time is given (FIG. 3). This is considered to be caused by a difference in size and electric charges of metal ions and organic ligands. In an example embodiment of the present disclosure, 1,3,5-benzenetricarboxylic acid and Cu2+ are used as an organic ligand and a metal ion, respectively. 1,3,5-benzenetricarboxylate has a size of 7.9 Å or 8.6 Å, and Cu2+ has a size of 0.87 Å only, which may result in a difference in diffusion rates within the matrix. As a result, it is confirmed in FIGS. 3 and 4 that different crystal generation rates are shown when the same time elapsed.

Also, when metal ions are reacted first with the anionic polymer, crystals are generated at different rates and different positions. Since an amount of ligands dispersed in the matrix is less than that of metal ions, it is observed that MOF crystals are mainly generated near the surface.

The method according to the present invention may further include, prior to step 1), step 1-0) of mixing the anionic polymer and a flexible polymer to produce an anionic polymer-containing solution. As the flexible polymer, any polymer mixed with the anionic polymer and having flexibility for providing a shape of a flexible membrane may be used without limitations. For example, the flexible polymer may be selected from the group consisting of polyimide, polyacetylene, cellulose acetate, polysulfone, polyethylene oxide, poly(4-methylpentene-1), poly(2,6-dimethyl phenylene oxide), polydimethylsiloxane, polyethylene, polyvinylidene chloride, polytetrafluoroethylene oxide, polyacrylonitrile, poly(vinyl alcohol), polystyrene, polyethylene glycol, poly(acrylamide) and nylon 6, but is not limited thereto.

The MOF according to the present invention may include a window with a size of approximately 4 to approximately 25 Å, and the size of the window may be uniform. The term "window" used herein refers to an open portion of the MOF. In an example embodiment of the present invention, HKUST-1 is used as a MOF and has a window size of 8.5 Å (18A). The MOF may have a specific window size based on a type of each metal and organic ligands, and accordingly only specific molecule(s) may be selectively passed and/or adsorbed. However, when MOF crystals are grown such that a window size is not uniform, selective adsorption of molecules based on the window size may become difficult, thereby reducing selectivity. It is confirmed that windows in grown crystals have a constant size even though ligands are dispersed in advance and metal ions are then diffused to grow crystals in the method of the present invention, instead of a method of growing crystals in advance and dispersing the crystals (FIGS. 17A through 17I and Experimental Example 4).

The terms "first single molecule size V1" and "second single molecule size V2" used herein refer to a size of first fluid and a size of second fluid that are in single molecule forms, respectively, and each represent kinetic molecular sizes (kinetic diameters) of fluid molecules. The term "kinetic molecular size (kinetic diameter)" used herein refers to a molecular size calculated based on molecular dynamics. Molecular dynamics refers to a method of numerically solving Newton's equations of motion at a level of atomic or similar molecular model. That is, molecular dynamics refers to a work to find out the positions of all atoms in a molecule as a function of time. Molecular dynamics is also used in theoretic simulation for an ideal molecular structure that is not substantially experimentally made. With the advance of theoretical physics, recently, molecular dynamics has widely been applied in the fields of material science, life science, and the like.

The term "fluid" used herein includes liquid and gas, and may be in a monomolecular state. In an example embodiment of the present invention, selective adsorption to methylene blue and rhodamine 6G molecules that are in liquid states is confirmed, but it is well known in the art that MOFs may adsorb a material that is in a gaseous state. Accordingly, the MOFs according to the present invention may also adsorb a gas molecule.

Although MOFs dispersed within the matrix of the present disclosure are not prepared based on the conventional post-fabrication method, crystallinity thereof is excellent and a size of a window formed in MOF crystals is constant. As a result, a crystal structure with a desired window size and constant window sizes may be generated, and thus it is possible to selectively adsorb a molecule that is in a gaseous state or a liquid state, based on the above window size. Thus, a first single molecule size of first fluid to be separated and a second single molecule size of second fluid may be compared, MOF crystals with a size of a window therebetween may be selected, a matrix containing MOFs prepared by the method according to the first aspect of the present disclosure may be prepared, and the first fluid and the second fluid may be individually separated using the matrix.

Effect of the Invention

A matrix containing metal-organic frameworks (MOFs) may be prepared by using an ionic polymer, in particular, an anionic polymer and dispersing organic ligands first in the polymer, and thus it is possible to prepare a matrix containing MOFs with enhanced adhesion between the polymer and MOFs while MOF crystals are uniformly dispersed in the matrix. Also, the matrix containing MOFs may be prepared within a relatively short period of time, convenience in a process may increase and energy may not be consumed because a heating process is not required. When alginate is used as an anionic polymer, an additional effect of preparing an environmentally friendly matrix containing MOFs may also be provided.

BRIEF DESCRIPTION OF THE DRAWINGS

FIG. 3 illustrates a change over time after addition of BTC3− ions.

FIG. 4 illustrates a change over time after addition of Cu2+ ions.

FIG. 5A illustrates the membrane observed with naked eyes, FIG. 5B illustrates an SEM image of a side view of the membrane, and FIGS. 5C and 5D illustrate SEM images of a top view and a bottom view of the membrane, respectively.

FIG. 6A illustrates the membrane observed with naked eyes, FIG. 6B illustrates an SEM image of a side view of the membrane, and FIGS. 6C and 6D illustrate SEM images of a top view and a bottom view of the membrane, respectively.

FIG. 8A illustrates a region of the matrix near a surface, FIG. 8B illustrates a region of the matrix far from the surface, and FIG. 8C illustrates a core region of the matrix.

FIGS. 15A and 15B illustrate absorption spectra for different concentrations of the methylene blue and rhodamine 6G, respectively, and FIGS. 15C and 15D illustrate absorbance for different concentrations of the methylene blue and rhodamine 6G at λmax, respectively.

FIGS. 16A and 16D illustrate absorption spectra of the Ca2+ ALG spheres before copper ions are added in Example 1 with respect to methylene blue and rhodamine 6G over time, FIGS. 16B and 16E illustrate absorption spectra of the Cu2+ ALG spheres before ligands are added in Comparative Example 1 with respect to methylene blue and rhodamine 6G over time, and FIGS. 16C and 16F illustrate a change in concentration over time at λmax of each of methylene blue and rhodamine 6G.

FIGS. 17A and 17D illustrate absorption spectra of the spheres MD-HK-ALG of Example 1 with respect to methylene blue and rhodamine 6G over time, respectively, FIGS. 17B and 17E illustrate absorption spectra of the spheres LD-HK-ALG of Comparative Example 1 with respect to methylene blue and rhodamine 6G over time respectively, FIG. 17C illustrates changes in concentrations of the spheres MD-HK-ALG of Example 1 and the spheres LD-HK-ALG of Comparative Example 1 over time at λmax of methylene blue, and FIG. 17F illustrates changes in concentrations of the spheres MD-HK-ALG of Example 1 and the spheres LD-HK-ALG of Comparative Example 1 over time at λmax of rhodamine 6G. FIG. 17G illustrates absorption spectra of the spheres MD-HK-ALG of Example 1 with respect to both methylene blue and rhodamine 6G over time, FIG. 17H illustrates absorption spectra of the spheres LD-HK-ALG of Comparative Example 1 with respect to both methylene blue and rhodamine 6G over time, and FIG. 17I illustrates changes in concentrations of the spheres MD-HK-ALG of Example 1 and the spheres LD- HK-ALG of Comparative Example 1 over time at λmax of methylene blue and rhodamine 6G.

FIG. 20A illustrates the result of the spheres of Example 1, and FIG. 20B illustrates the result of the spheres of Comparative Example 1.

BEST MODE FOR CARRYING OUT THE INVENTION

Figure 1:
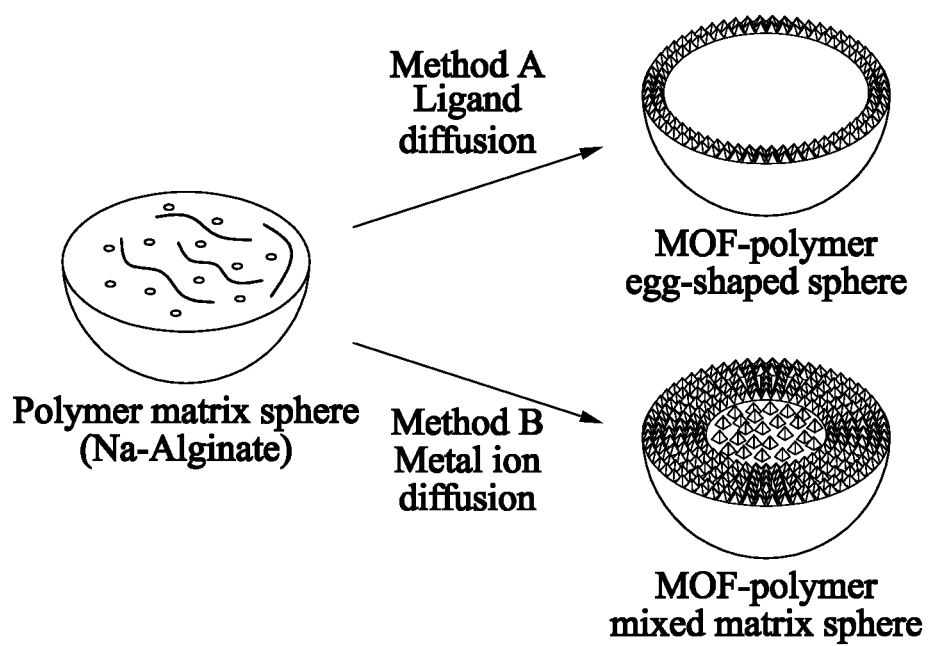
FIG. 1 schematically illustrates a difference between matrix structures generated according to an order of addition of metal and ligands in a method for preparing a metal-organic framework (MOF)-containing matrix of the present disclosure.
Figure 2:
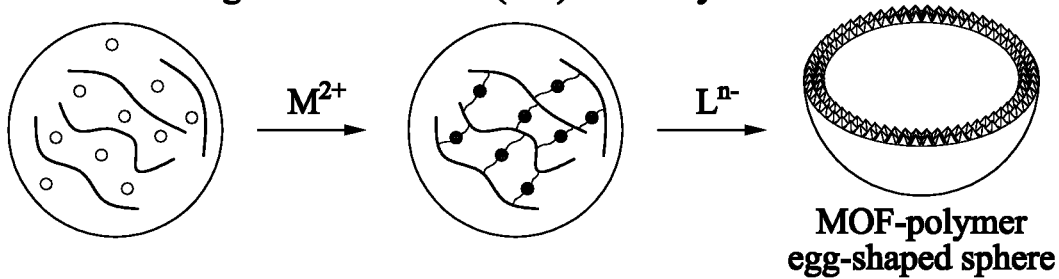
FIG. 2 schematically illustrates a method for preparing a MOF-containing matrix of the present disclosure, according to an order of addition of metal and ligands.
Figure 2:
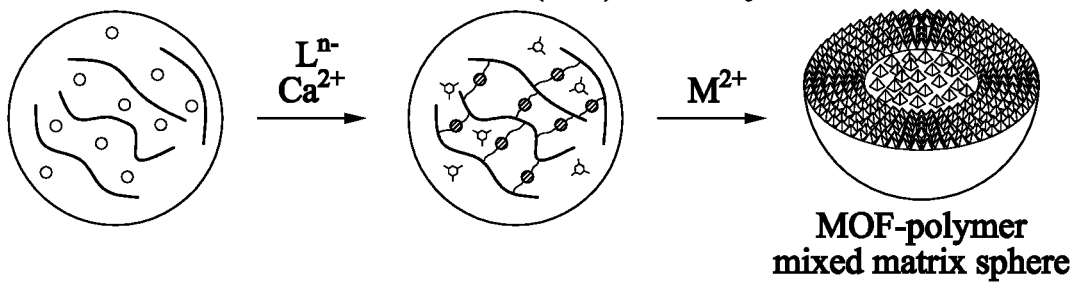

Hereinafter, the present disclosure will be described in more detail with reference to the following examples. However, these examples are provided only for illustration of the present invention, and it should not be construed as limiting the scope of the present invention to these examples.

Throughout the present specification, "%" used to indicate a concentration of a specific material refers to % by weight/weight for solid/solid, % by weight/volume for solid/liquid and % by volume/volume for liquid/liquid, unless otherwise stated.

Materials Used

The following materials were used in examples and comparative examples.

Copper (II) nitrate hemipentahydrate ($Cu(NO_3)_2 \cdot 2.5H_2O$): purity of 98.0 to 102%, manufactured by Alfa Aesar.

Trimesic acid (1,3,5-benzenetricarboxylic acid, H3BTC): purity of 95%, manufactured by Aldrich.

Triethylamine (TEA): purity of 99%, manufactured by Alfa Aesar

Ethanol (EtOH): purity of 94.5%, manufactured by Daejung.

Acetone (ACT): purity of 99.5%, manufactured by Daejung.

Zinc (II) nitrate hexahydrate ($Zn(NO_3)_2 \cdot 6H_2O$): purity of 99%, manufactured by Aldrich.

2,5-Dihydroxyterephthalic acid (H4DOBDC): purity of 97%, manufactured by Alfa Aesar.

Methanol (MeOH): purity of 99.5%, manufactured by Daejung.

Sodium alginate (Na+ALG, CAS number 9005-38-3, LOT number MKBX6322V): manufactured by Sigma Aldrich.

$Ca(NO_3)_2 \cdot 4H_2O$ (calcium nitrate tetrahydrate): purity of 99%, manufactured by Aldrich.

Methylene blue (MB, LOT Number 10187938): manufactured by Alfa Aesar.

Rhodamine 6G (R6G) purity: 99%, manufactured by Aldrich.

Poly(vinyl alcohol) (PVA, Mw 89,000-98,000): manufactured by Aldrich.

Deionized distilled water (DDW): purified and manufactured by a purification system (MQ Direct 8 of Merck Millipore).

All solvents were distilled and purified with zeolite 4A in a moisture-free argon-charged glove box. All synthesized samples were also stored in the moisture-free argon-charged glove box prior to use.

Preparation Example 1: Preparation of Pristine HKUST-1 Powder

To a vial, 10 mL of DDW and $Cu(NO_3)_2 \cdot 2.5H_2O$ (0.87 g, 3.7 mmol) were added. To another vial, 10 mL of ethanol was added and H3BTC (0.22 g, 1.0 mmol) and TEA (0.30 g, 3.0 mmol) were added, to prepare deprotonated H3BTC (BTC3−). A $Cu(NO_3)_2$ solution was added to a BTC3− solution, followed by continuous stirring at room temperature for 3 hours (h). Subsequently, washing with ethanol was performed, to obtain a crystalline solid. All processes were performed at room temperature.

Preparation Example 2: Preparation of MOF-74(Zn) Powder

To a flask, 10 mL of DDW and $Zn(NO_3)_2 \cdot 6H_2O$ (0.59 g, 2.0 mmol) were added. In another flask, 10 mL of DDW was added and H4DOBDC (0.20 g, 1.0 mmol) and TEA (0.40 g, 4.0 mmol) were added, to prepare deprotonated H4DOBDC (DOBDC4−). A $Zn(NO_3)_2 \cdot 6H_2O$ solution was added to a DOBDC4− solution, followed by continuous stirring at room temperature for 3 h. Subsequently, washing with a mixture of water and methanol was performed, to obtain a crystalline solid. All processes were performed at room temperature.

Comparative Example 1: Preparation of HK-ALG Spheres Via BTC3− Ligand Dispersion (LD-HK-ALG)

An aqueous 5.0 wt % Na+ALG solution (0.5 ml) was dropped into a 0.5 M $Cu(NO_3)_2$ solution (5 ml) using a Pasteur pipette. The drops immediately became turquoise blue spherical solids (see FIG. 3). Then, the above immersion was kept for 30 min to fully exchange Na+ ions with Cu2+ ions (hereinafter, referred to as "Cu2+ALG"). Subsequently, the Cu2+ALG spherical solids were washed by immersing them into ethanol for 10 min, and this process was repeated 5 times to completely replace remaining water, to facilitate drying.

A 0.5 M BTC3− solution (5 mL) was prepared by mixing H3BTC and TEA with 1-to-3 stoichiometry in a 1:1 mixture of H2O and EtOH. After drying of the Cu2+ ALG spherical solids for 1 h, the Cu2+ALG spherical solids were immersed into the 0.5 M BTC3− solution. BTC3− ligands were allowed to react with Cu3+ in the Cu2+ALG. The reaction was conducted at room temperature, and changes during the reaction were observed every 5, 10, 20, 30, and 60 min after the reaction. Results thereof were shown in FIG. 3.

Example 1: Preparation of HK-ALG Spheres Via Cu2+ Ion Dispersion (MD-HK-ALG)

An aqueous 0.5 M BTC3− solution was prepared by mixing H3BTC and TEA with 1-to-3 stoichiometry in distilled water. A BTC3−-containing Na+ALG solution was prepared by mixing 1 ml of the aqueous 0.5 M BTC3− solution and 9 mL of an aqueous 5.0 wt % Na+ALG solution. Subsequently, the BTC3−-containing Na+ALG solution was dropped into a 0.5 M $Ca(NO_3)_2$ solution using a Pasteur pipette. The drops immediately became white solid spheres (see FIG. 4). Subsequently, the above immersion was kept for 30 min to fully exchange Na+ ions with Ca2+ ions (hereinafter, referred to as "Ca2+ALG"). To sufficiently fill the spheres with BTC3− ligands, immersion of the spheres into a 0.1 M BTC3− solution was repeated 3 times.

A 0.5M Cu(NO3)2 solution was prepared in a 1:1 mixture of H2O and ACT. After drying of the spheres for 1 h, the spheres were immersed into the 0.5M Cu(NO3)2 solution (5 mL). BTC3− ligands in the Ca2+ ALG were allowed to react with Cu2+. The reaction was conducted at room temperature, and changes during the reaction were observed every 5, 10, 20, 30, and 60 min after the reaction. Results thereof were shown in FIG. 4.

Comparative Example 2: Preparation of HK-(ALG+PVA) Membrane Via BTC3− Ligand Dispersion (LD-HK-(ALG+PVA)M)

A mixed polymer solution was prepared by mixing 5.0 wt % Na+ALG (5 mL) and a PVA solution (20 mL). The mixed polymer solution was dropped and spread on a flat glass plate with a dimension of approximately 15×15 cm2. Subsequently, a 0.5 M Cu(NO3)2 solution was sprayed onto the plate using a spray gun. The spraying was performed for 30 min to allow Na+ ions of a Na+ALG polymer chain to be exchanged with Cu2+ ions and to be crosslinked. After washing with ethanol, an obtained elastic polymer membrane was dried under ambient conditions at room temperature for 1 h.

A 0.5 M BTC3− solution was prepared by mixing H3BTC and TEA with 1-to-3 stoichiometry in DDW. The elastic polymer membrane was immersed into the 0.5 M BTC3− solution to allow BTC3− ligands to react with Cu2+ ions. The reaction was conducted at room temperature for 30 min. After washing with DDW, the membrane was dried under ambient conditions at room temperature, and cut into a size of 4×6 cm2 prior to use.

Example 2: Preparation of HK-(ALG+PVA) Membrane Via Cu2+Ion Dispersion (MD-HK-(ALG+PVA)m)

An aqueous 0.5 M BTC3− solution was prepared by mixing H3BTC and TEA with 1-to-3 stoichiometry in distilled water. A BTC3-containing Na+ALG solution was prepared by mixing 5 ml of the aqueous 0.5 M BTC3− solution and 5 nil of an aqueous 5.0 wt % Na+ALG solution. In a separate vial, an aqueous 5.0 wt % PVA solution was prepared by dissolving PVA powder in DDW. The aqueous 5.0 wt % PVA solution was continuously stirred at 80° C. for 6 h to completely dissolve the PVA powder. The PVA solution was added to the BTC3-containing Na+ALG solution, and the mixed solution was dropped and spread on a flat glass plate with a dimension of approximately 15×15 cm2. Subsequently, a 0.5 M Ca(NO3)2 solution was sprayed onto the plate using a spray gun for 30 min. To sufficiently include BTC3− ligands in the membrane, an obtained elastic polymer membrane was immersed into a 0.5 M BTC3− solution, and this process was repeated two or more times. After slightly washing with DDW, the membrane was dried at room temperature for 1 h.

A 0.5 M Cu(NO3)2 solution was prepared by dissolving Cu(NO3)2 in a 1:1 mixture of H2O and ACT. The membrane was immersed into the 0.5 M Cu(NO3)2 solution at room temperature for 30 m, to allow BTC3− ligands in the membrane to react with Cu2+ ions. After washing with DDW, the membrane was dried under ambient conditions at room temperature, and cut into a size of 4×6 cm2 prior to use.

Comparative Example 3: Preparation of MOF-74(Zn)-ALG Spheres Via DOBDC4-Ligand Dispersion (LD-MOF74-ALG)

An aqueous 5.0 wt % Na+eLG solution was dropped into a 0.5 M Zn(NO3)2 solution using a Pasteur pipette. The drops immediately became white spherical solids. Subsequently, the above immersion was kept for 30 min to fully exchange Na ions with Zn2+ions (hereinafter, referred to as "Zn2+ALG"). Subsequently, the Zn2+ALG spherical solids were washed by immersing them into ethanol for 10 min, and this process was repeated 5 times to completely replace remaining water, to facilitate drying.

A 0.5 M DOBDC4− solution was prepared by mixing H4DOBDC and TEA with 1-to-4 stoichiometry in a 1:1 mixture of H2O and EtOH. After drying of the Zn2+ALG spherical solids for 1 h, the Zn2+ALG spherical solids were immersed into the 0.5 M DOBDC4− solution. DOBDC4− ligands were allowed to react with Zn2+ in the Zn2+ALG. The was conducted at room temperature for 30 min.

Example 3: Preparation of MOF-74(Zn)-ALG Spheres Via Zn2+ Ion Dispersion (MD-MOF74-ALG)

An aqueous 0.5 M DOBDC4− solution was prepared by mixing H4DOBDC and TEA with 1-to-4 stoichiometry in distilled water. A DOBDC4−-containing Na+ALG solution was prepared by mixing 1 ml of the aqueous 0.5 M DOBDC4− solution and 9 ml of an aqueous 5.0 wt % Na+ALG solution. Subsequently, the DOBDC4−-containing Na+ALG solution was dropped into a 0.5 M Ca(NO3)2 solution using a Pasteur pipette. The drops immediately became yellow solid spheres. Subsequently, the above immersion was kept for 30 min to fully exchange Na+ ions with Ca2+ ions (hereinafter, referred to as "Ca2+ALG"). To sufficiently fill the spheres with DOBDC4− ligands, immersion of the spheres into a 0.1 M DOBDC4− solution was repeated 3 times.

A 0.5M Zn(NO3)2 solution was prepared in a 1:1 mixture of H2O and ACT. After drying of the spheres for 1 h, the spheres were immersed into the 0.5M Zn(NO3)2 solution. DOBDC4− ligands in the Ca2+ALG were allowed to react with Zn2+. The reaction was conducted at room temperature for 30 min.

EXPERIMENTAL EXAMPLE

The following devices were used in each experiment.
UV-visible light absorption spectrum: an Agilent 8453 UV-VIS spectrophotometer was used.
PXRD pattern: a PANalytical diffractometer (Empyrean) with a monochromatic nickel-filtered Cu Kα beam was used.
Optical microscope: an S43T microscope (Bimeince) was used.
Scanning electron microscope (SEM): an FE-SEM (Hitachi S-4800) was used and operated at an acceleration voltage of 3 kV, after samples were coated with Au—Pt alloys with a thickness of 3 nm.
Energy dispersive X-ray spectroscopy (EDS): an XFlash® 5030 Detector (Bruker) equipped on an FE-SEM was used.
Thermogravimetric analysis (TGA): was performed under N2 gas at a flow rate of 100 mL/min using a Q500 (TA Instruments).

Experimental Example 1: Microscope Analysis

Figure 3:
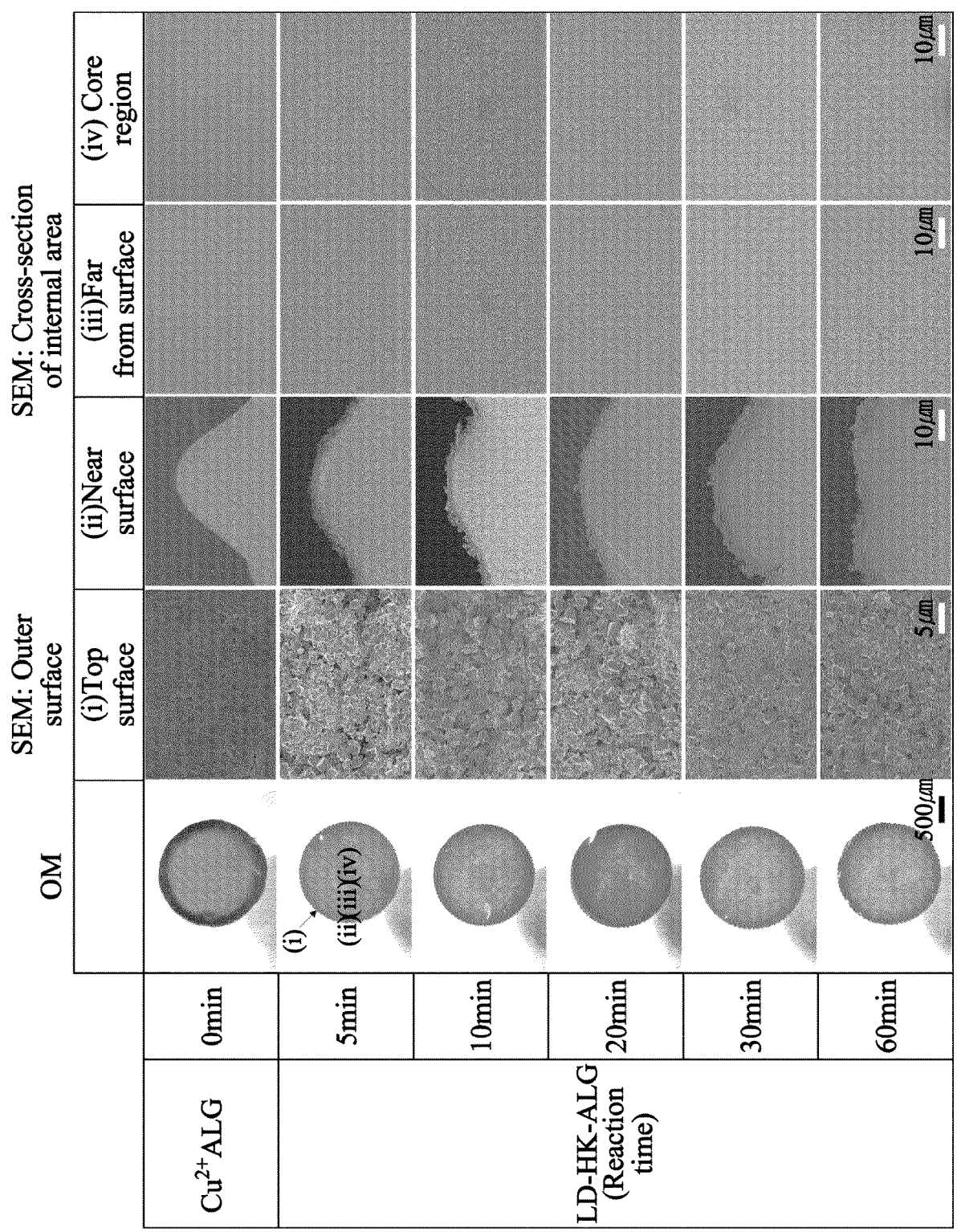
FIG. 3 illustrates microscopic observation results of a MOF-containing matrix formed in Comparative Example 1 for different reaction times. OM represents an optical microscope result, SEM represents a scanning electron microscope result.
Figure 4:
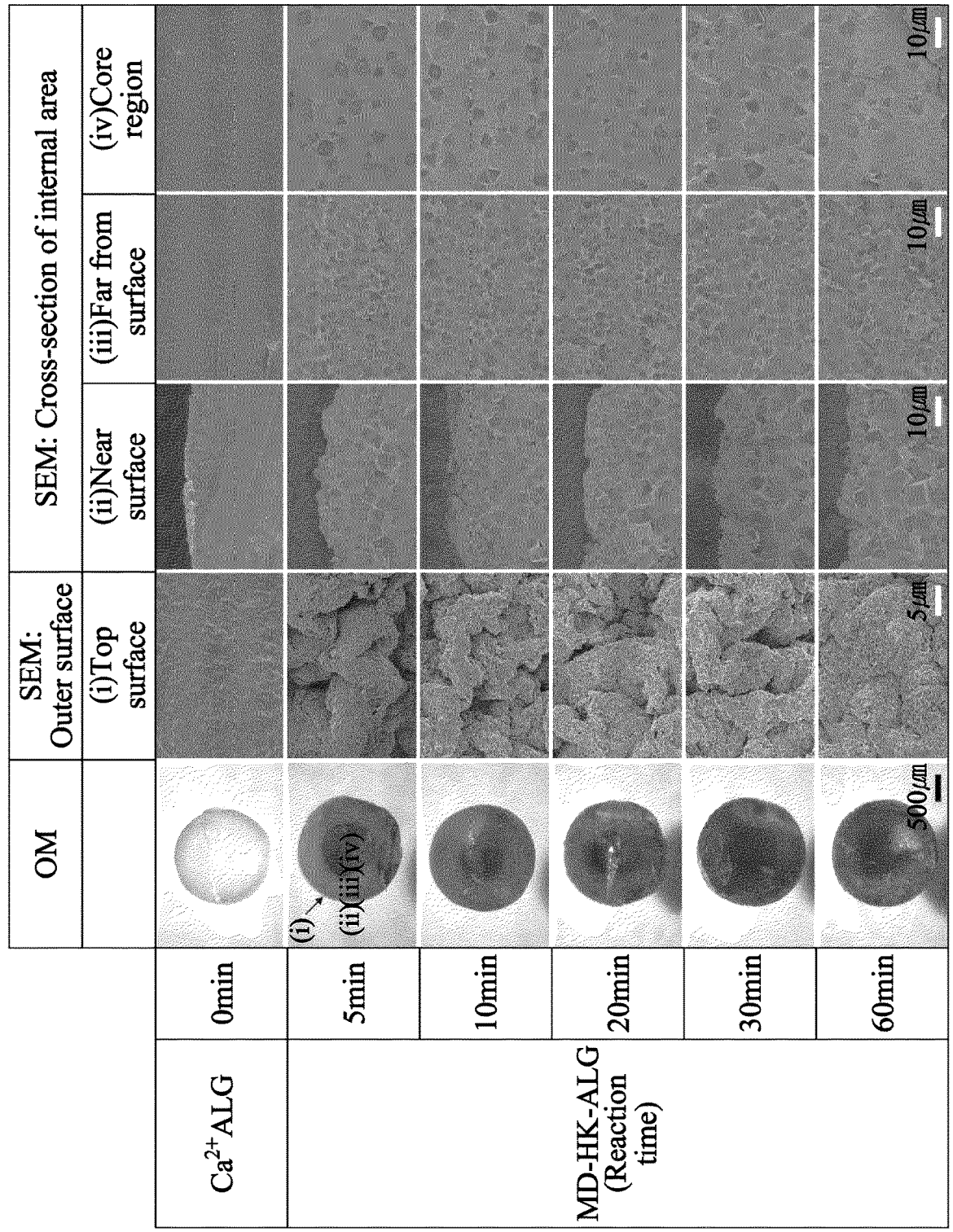
FIG. 4 illustrates microscopic observation results of a MOF-containing matrix formed in Example 1 for different reaction times. OM represents an optical microscope result, SEM represents a scanning electron microscope result.
Figure 5A:
FIGS. 5A through 5D illustrate observation results of a membrane prepared in Comparative Example 2.
Figure 5B:
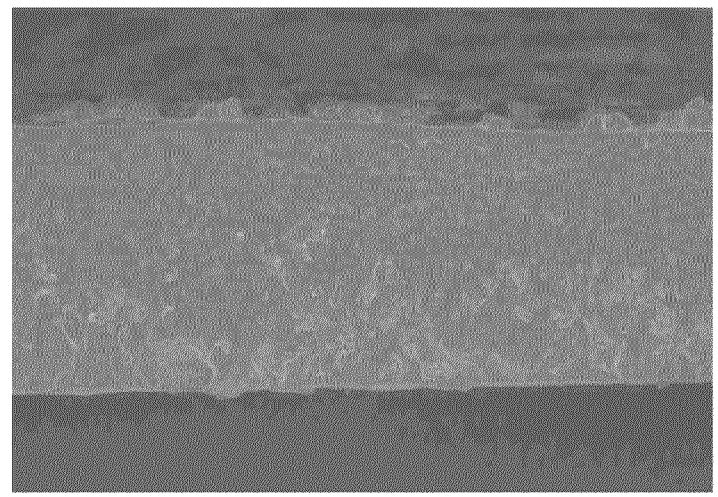
Figure 5C:
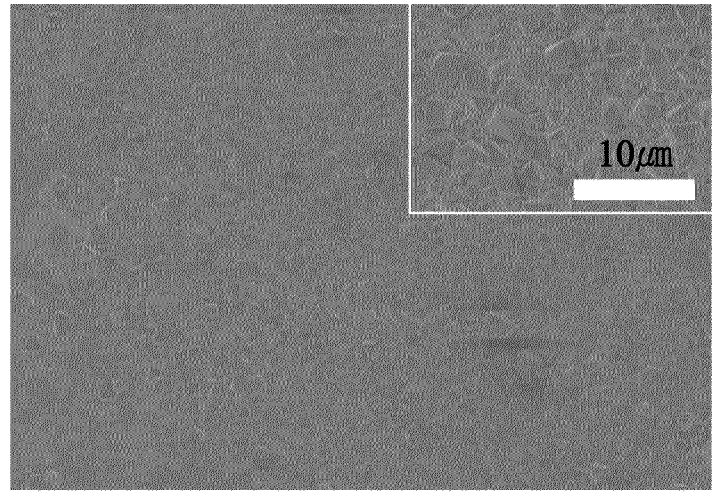
Figure 5D:
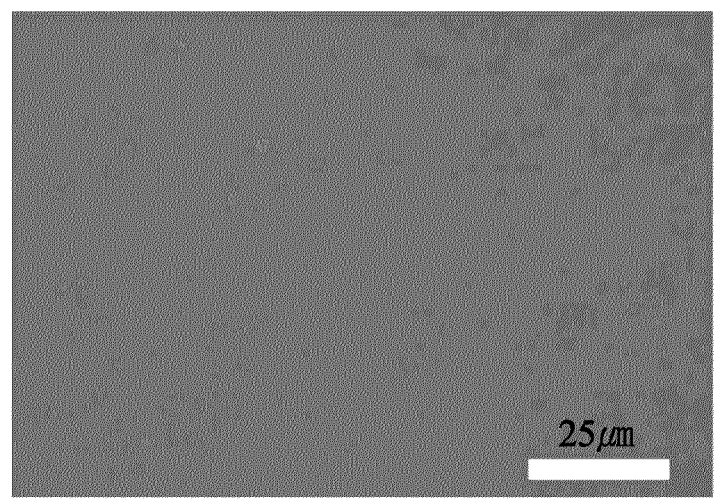
Figure 6A:
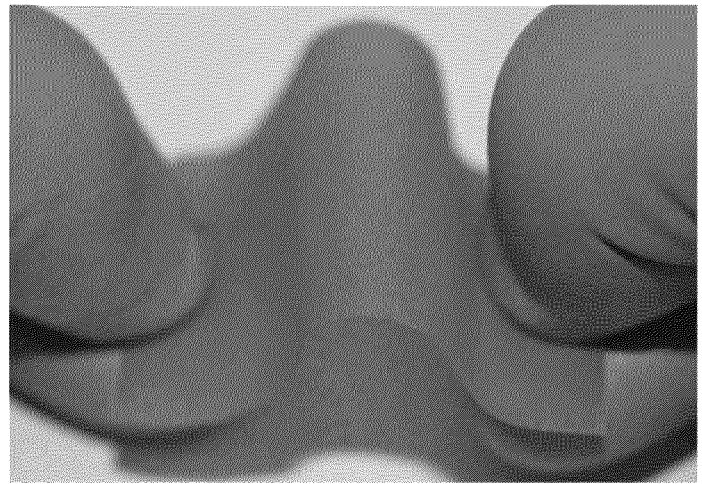
FIGS. 6A through 6D illustrate observation results of a membrane prepared in Example 2.
Figure 6B:
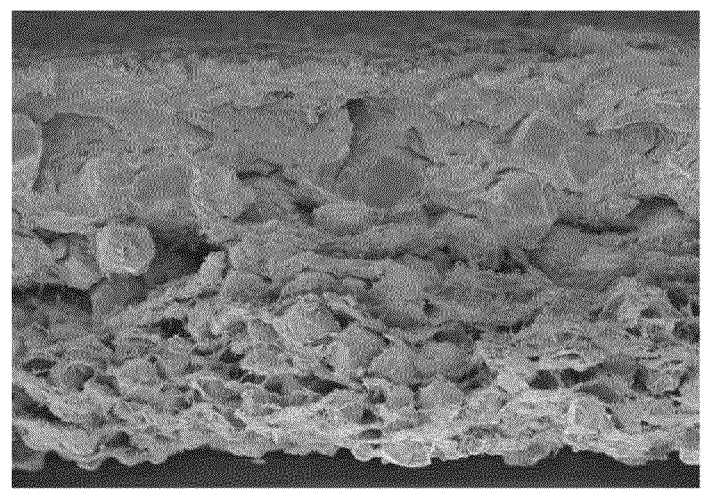
Figure 6C:
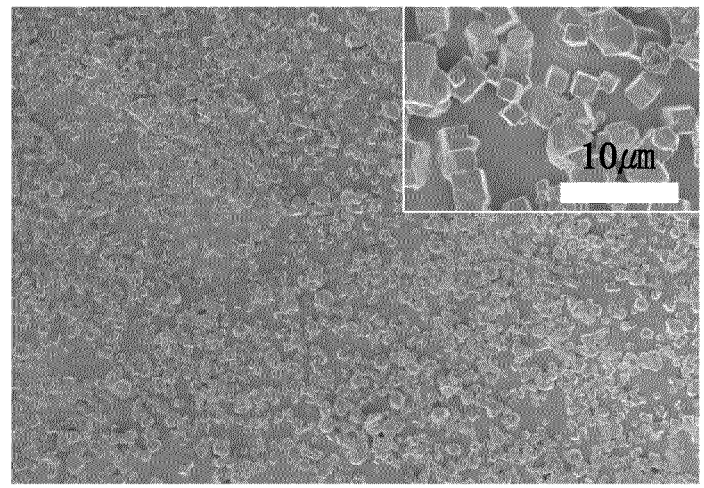
Figure 6D:
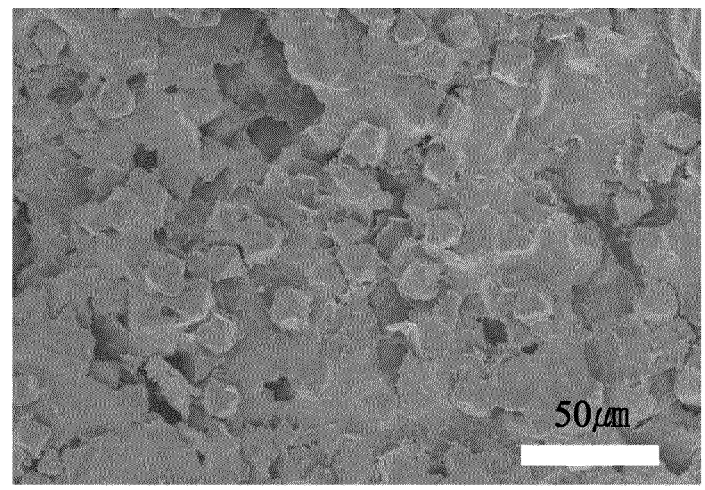

The spheres prepared in Example 1 and Comparative Example 1 were individually observed through the optical microscope and the SEM (FIGS. 3 and 4). The changes during the reaction were observed every 5, 10, 20, 30, and 60 min after the reaction, and a region (i) of an outer surface, a region (ii) near a surface, a region (iii) far from the surface, and a core region (iv) were individually observed.

In the spheres of Comparative Example 1, HKUST-1 crystals were generated only on and near the surface after a reaction time of 1 h, and a structure having a core and a shell enclosing the core, like an egg, was observed (FIG. 3). In the spheres of Example 1, HKUST-1 crystals were generated uniformly from the core region to the surface (FIG. 4). In particular, crystals were generated from a point in time at which 5 min elapsed after the reaction, and accordingly it is confirmed that crystals may be generated within a relatively short period of time and that crystals with a uniform size were generated.

The membranes of Example 2 and Comparative Example 2 were individually observed with naked eyes and the SEM (FIGS. 5A through 5D and 6A through 6D). All the membranes were prepared as flexible polymer membranes, and a polymer membrane with a thickness of approximately 140 μm was shown. In particular, it is confirmed that HKUST-1 crystals were uniformly generated in all regions of the membrane of Example 2.

Figure 7:
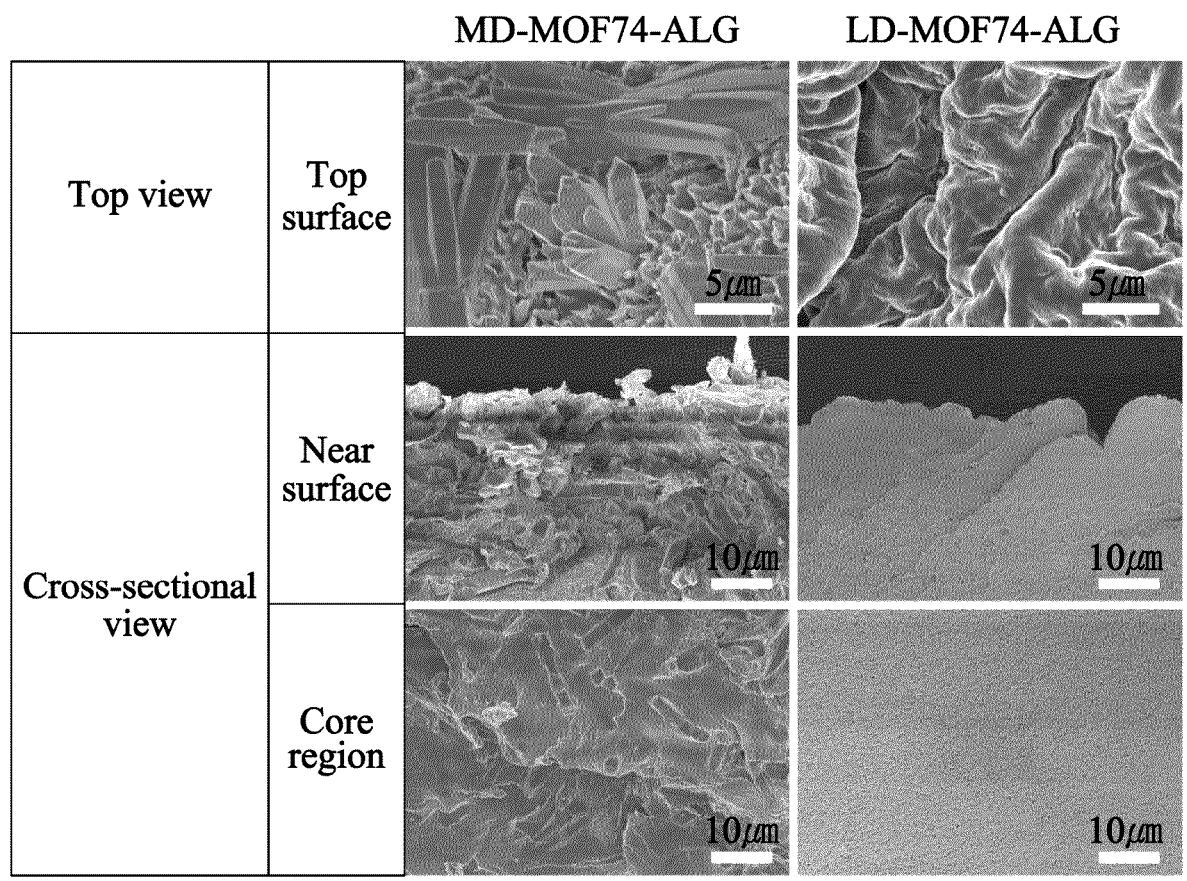
FIG. 7 illustrates SEM images of surfaces and interiors of matrices prepared in Example 3 and Comparative Example 3. MD-MOR74-ALG is a result of Comparative Example 3, and LD-MOR74-ALG is a result of Example 3.

The spheres prepared in Example 3 and Comparative Example 3 were individually observed by the SEM and shown in FIG. 7 (Comparative Example 3: LD-MOF74-ALG, and Example 3: MD-MOF74-ALG). In particular, it is confirmed that MOF74 crystals were generated uniformly from a core region to a surface in the spheres of Example 3 and have a uniform size.

Figure 8A:
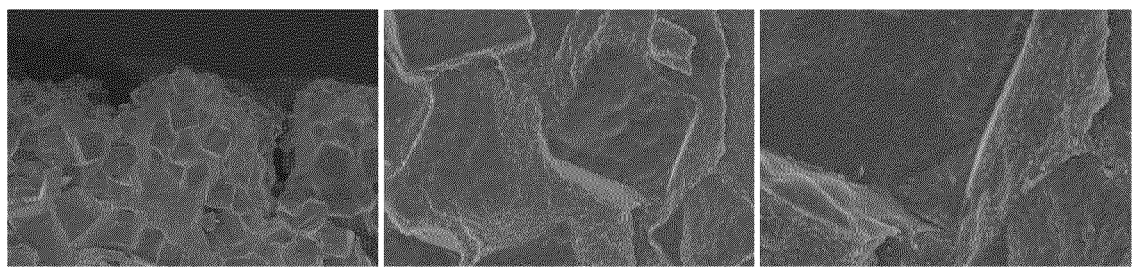
FIGS. 8A through 8C illustrate magnified SEM images of a matrix prepared in Example 1.
Figure 8B:
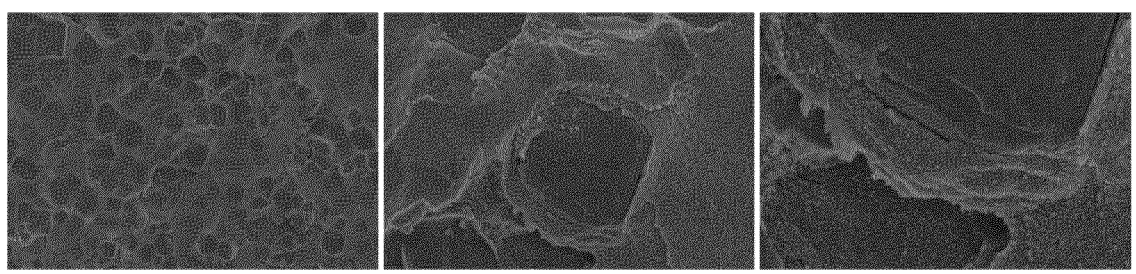
Figure 8C:
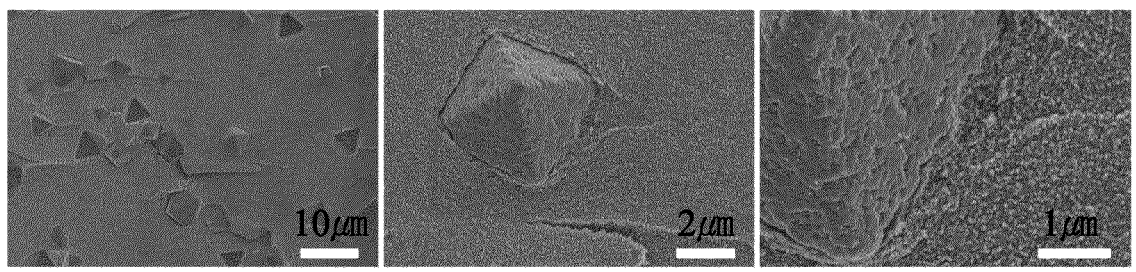

The spheres prepared in Example 1 were magnified and observed by the SEM to observe HKUST-1 crystals at each region in more detail (FIGS. 8A through 8C). It is confirmed that crystals are distributed uniformly from a core region to a region on a surface and have similar sizes. Also, it is confirmed that HKUST-1 crystals and a polymer matrix are well bonded.

As described above, it may be found that in the MOF-containing matrix prepared by the method according to the present invention, MOFs have a uniform size and are well bonded to a polymer matrix. Also, it is confirmed that MOF crystals are uniformly dispersed in the matrix.

Experimental Example 2: XRD Analysis

Figure 9:
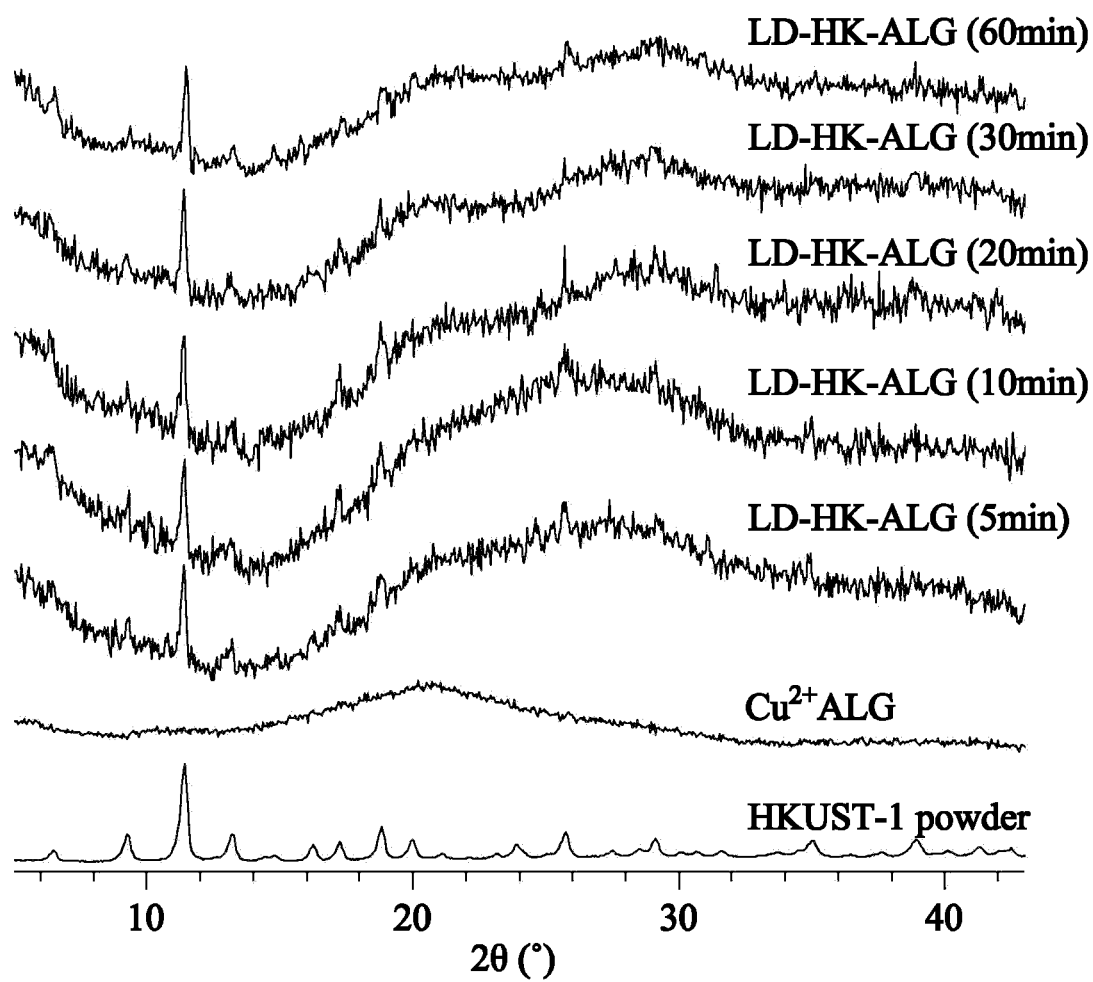
FIG. 9 illustrates results of X-ray diffraction (XRD) of a matrix prepared in Comparative Example 1 for different reaction times.
Figure 10:
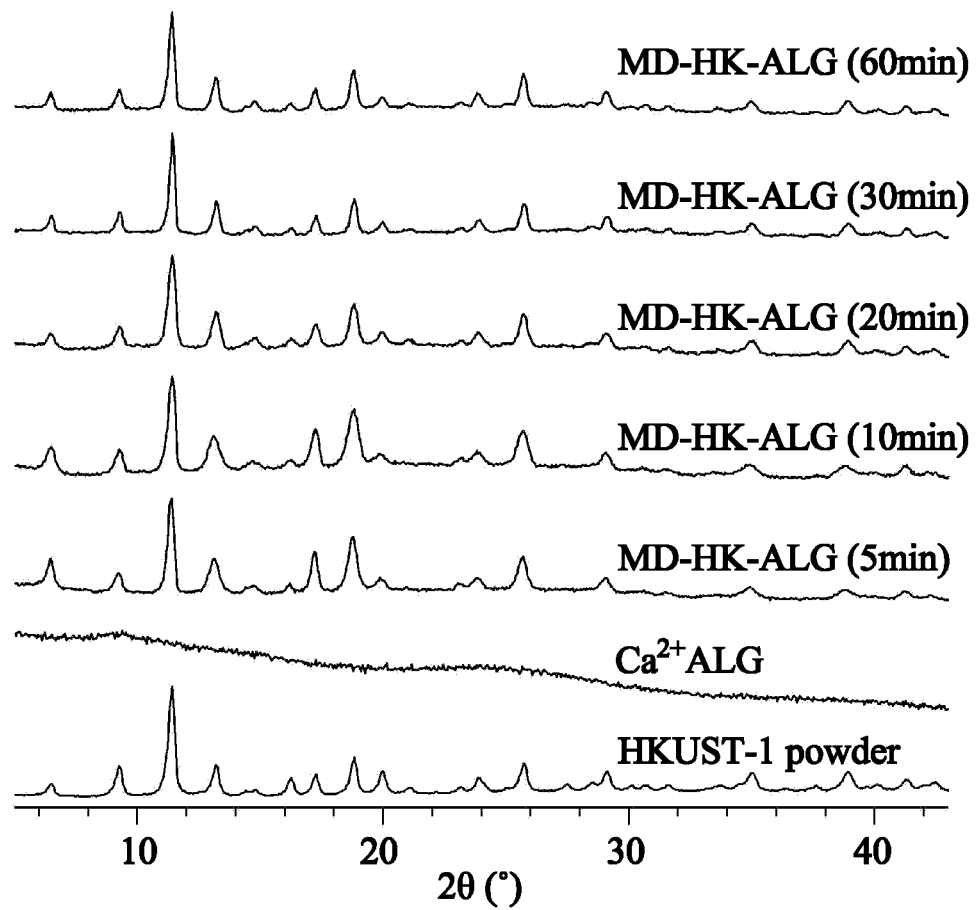
FIG. 10 illustrates results of XRD of the matrix prepared in Example 1 for different reaction times.
Figure 11:
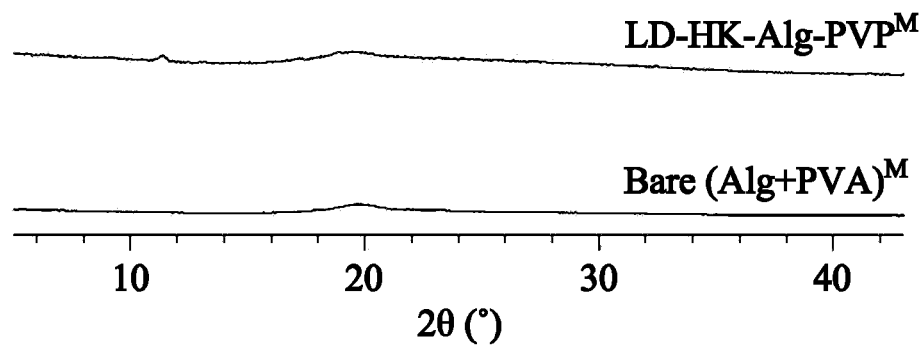
FIG. 11 illustrates results of XRD of the membrane prepared in Comparative Example 2 and a polymer membrane that does not contain a MOF.
Figure 12:
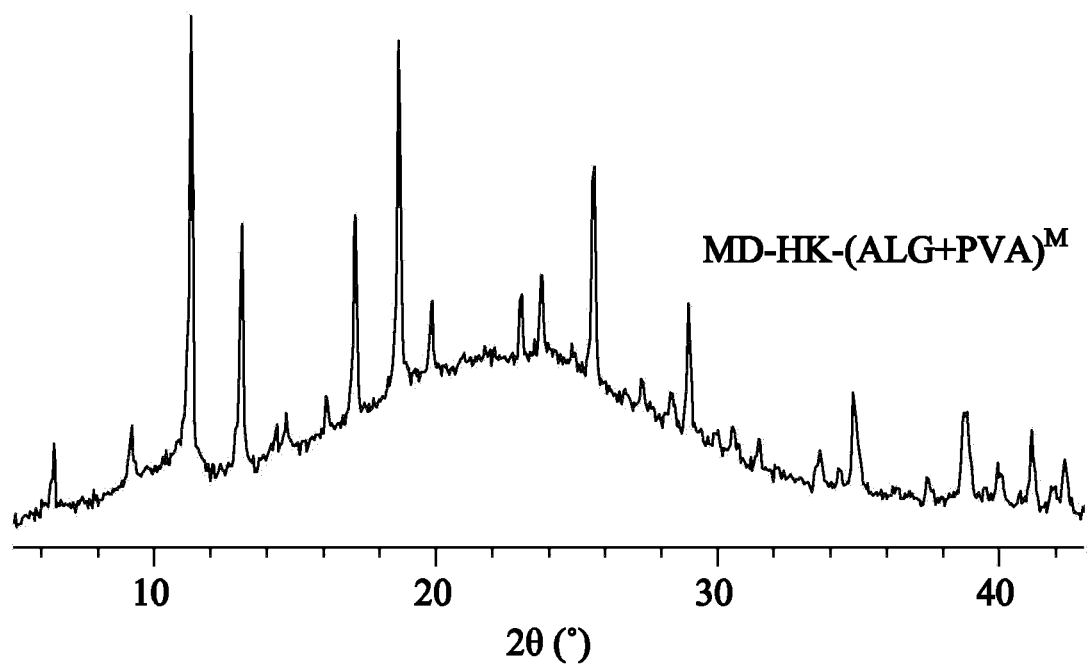
FIG. 12 illustrates results of XRD of the membrane prepared in Example 2.
Figure 13:
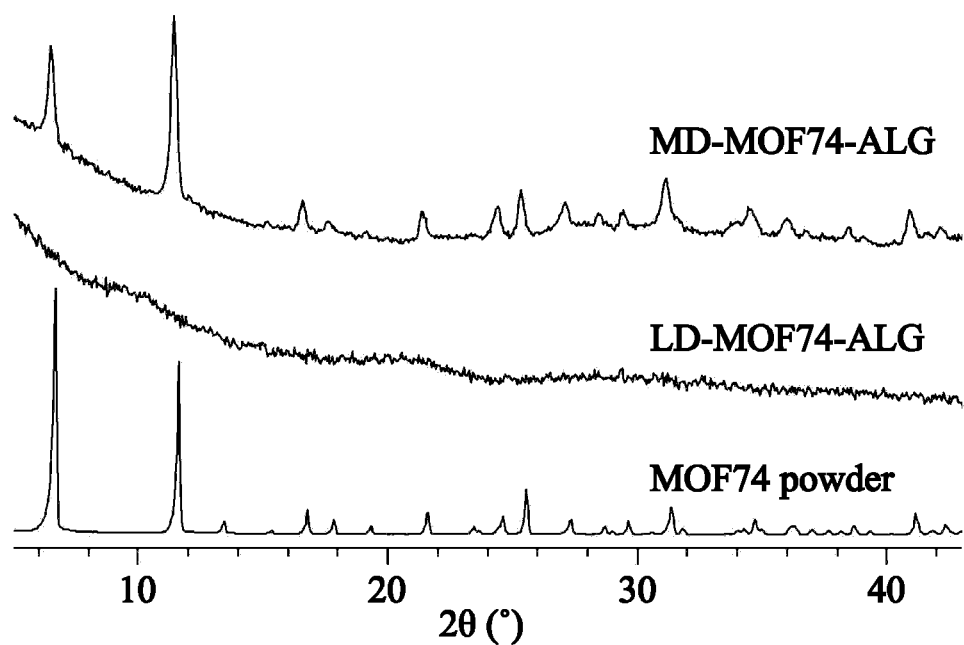
FIG. 13 illustrates results of XRD of the matrices prepared in Example 3 and Comparative Example 3 and crystals of Preparation Example 2.
Figure 14:
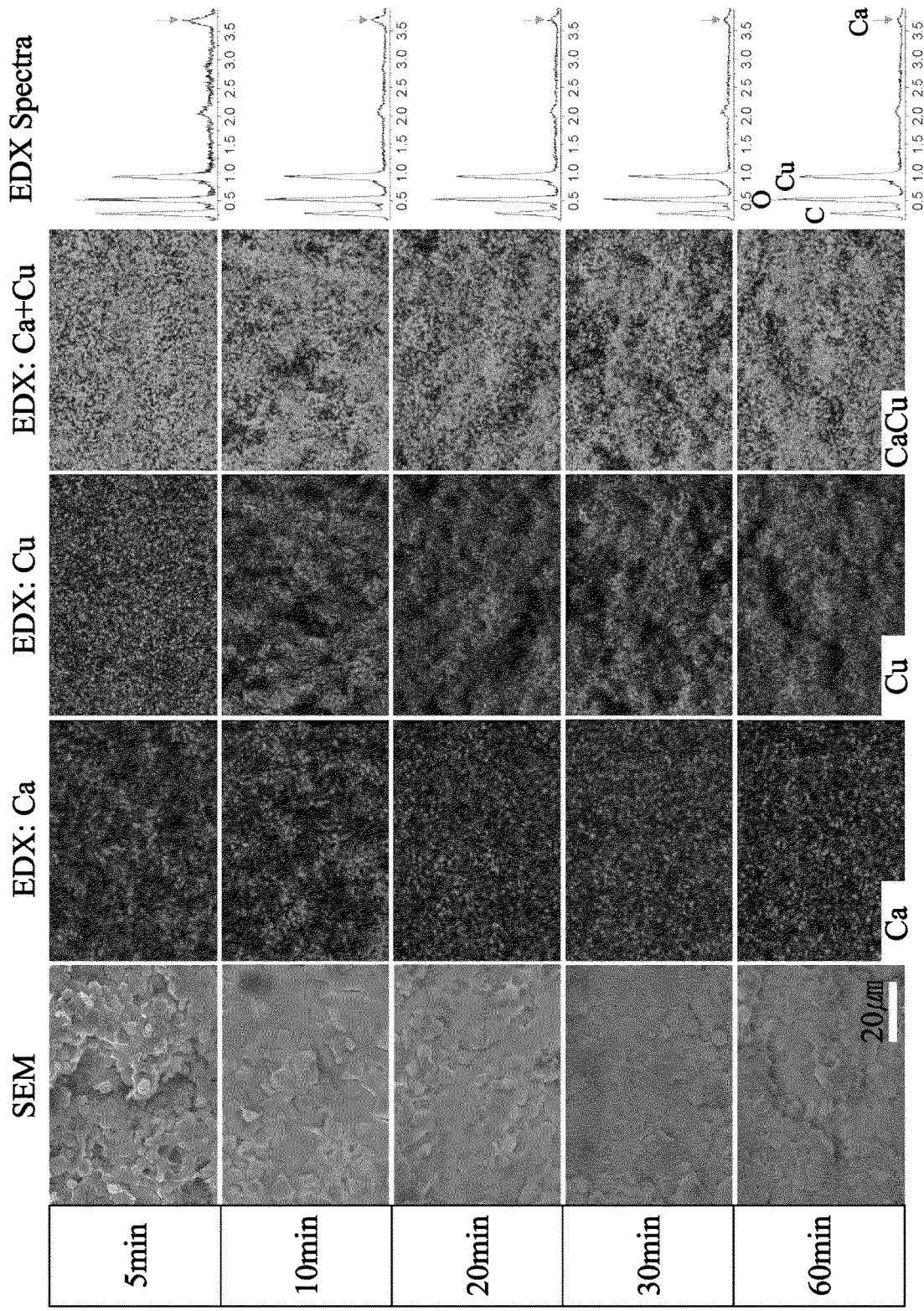
FIG. 14 illustrates results of SEM measurement and EDS analysis of the matrix prepared in Example 1 for different reaction times.
Figure 15A:
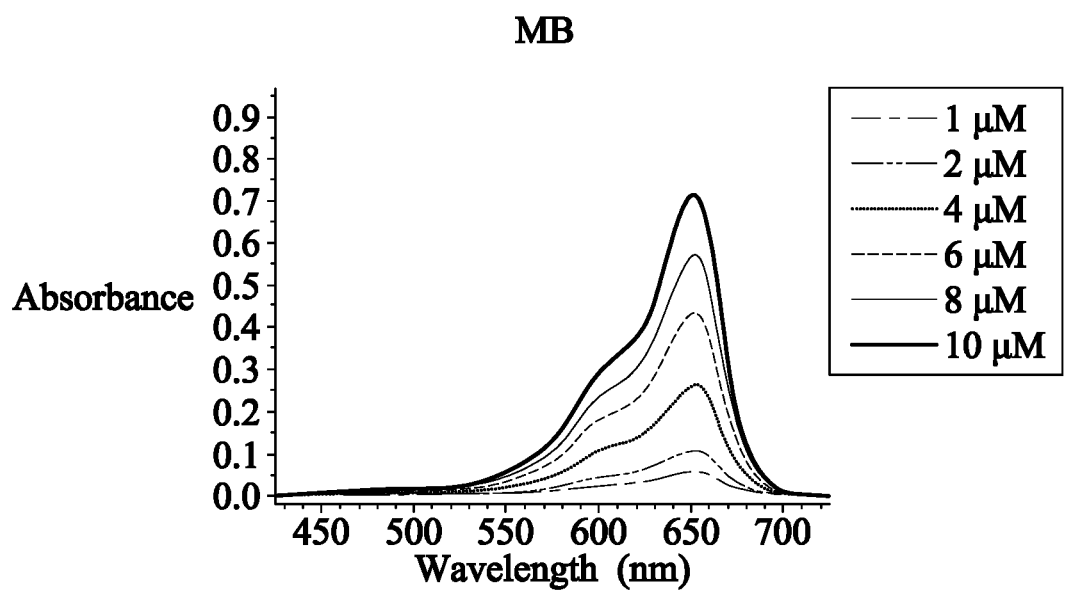
FIGS. 15A through 15D illustrate absorbance of methylene blue and rhodamine 6G with respect to UV-visible light.
Figure 15B:
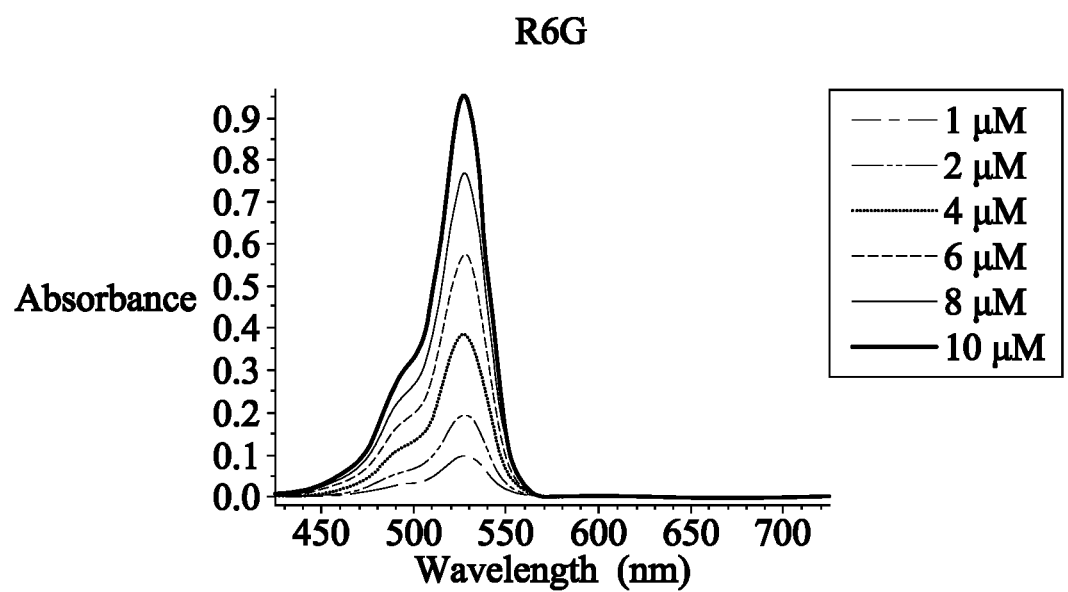
Figure 15C:
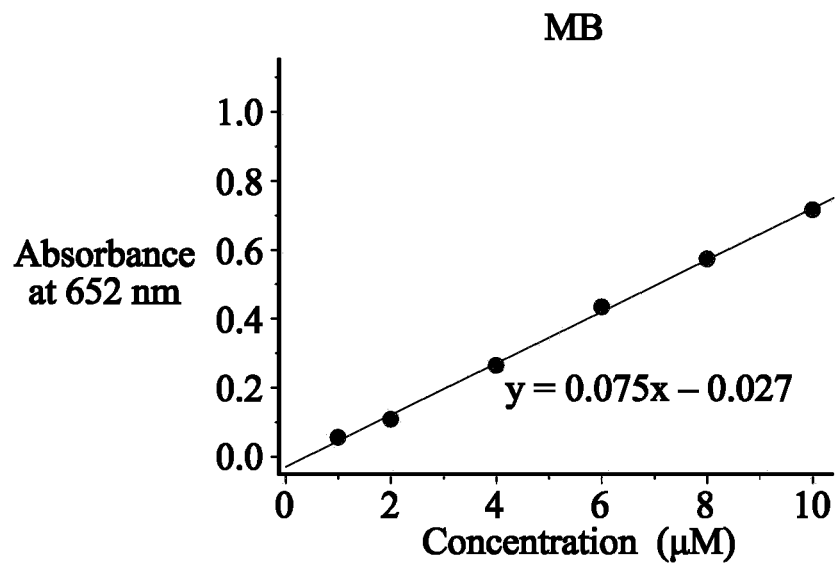
Figure 15D:
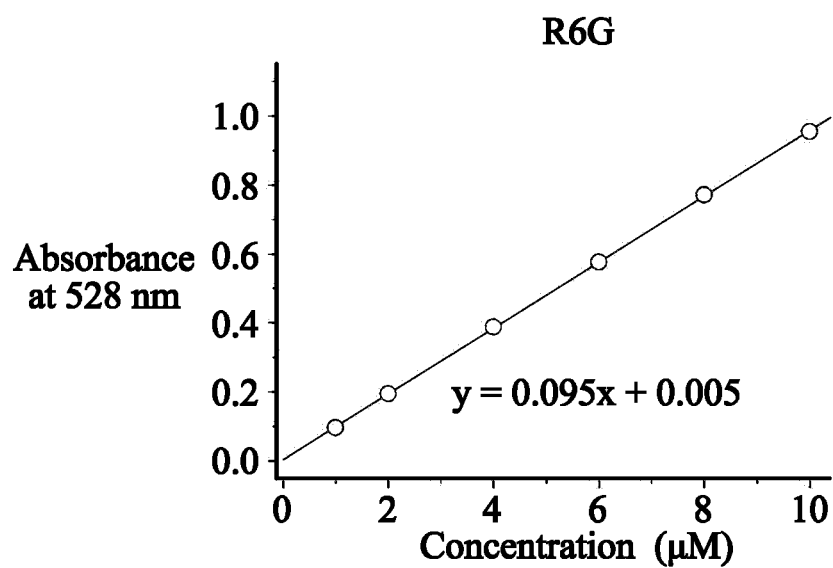
Figure 16A:
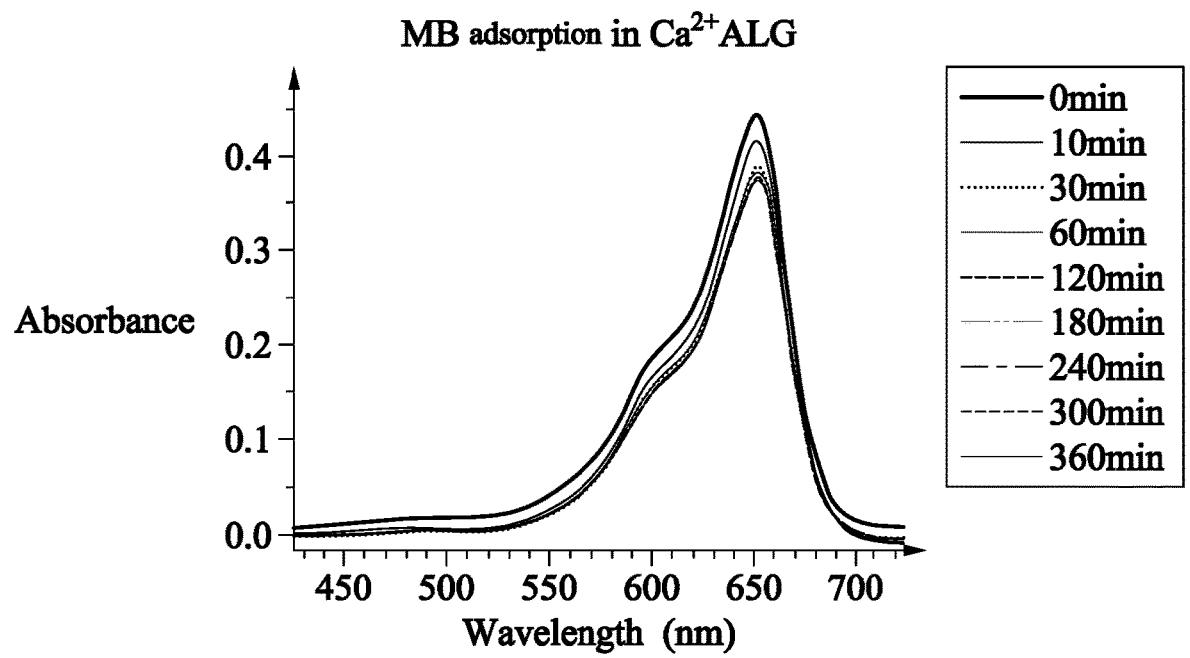
FIGS. 16A through 16F illustrate absorbance of Cu2+ ALG spheres before ligands are added in Comparative Example 1 with respect to methylene blue and rhodamine 6G, and absorbance of Ca2+ ALG spheres before copper ions are added in Example 1 with respect to methylene blue and rhodamine 6G.
Figure 16B:
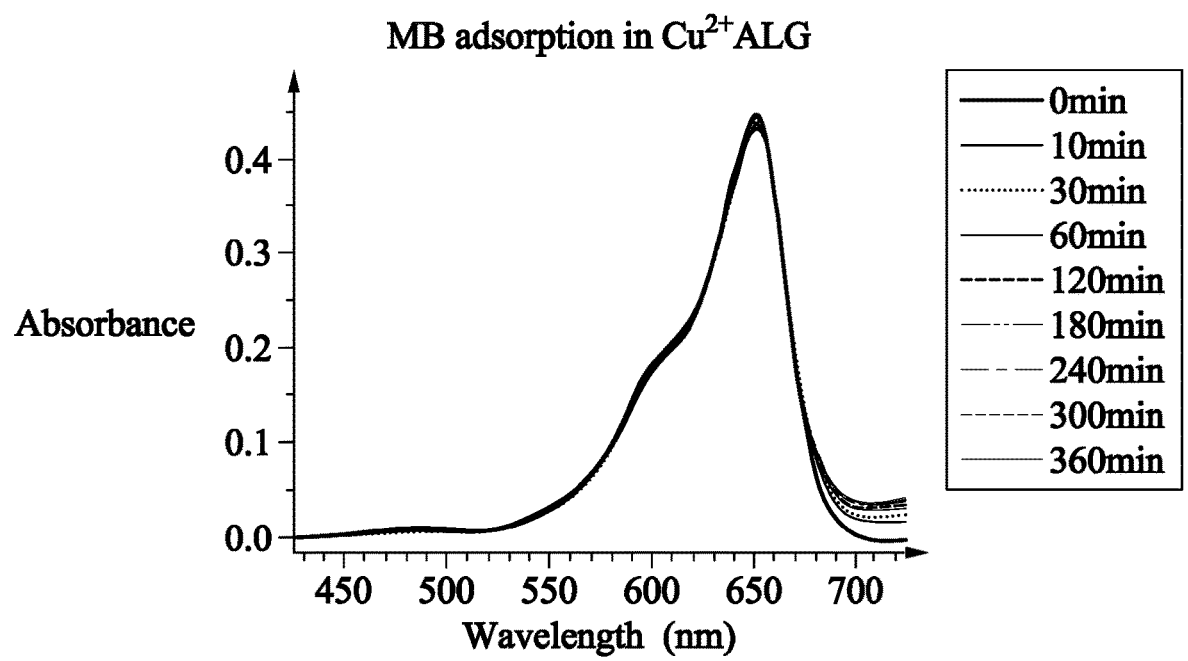
Figure 16C:
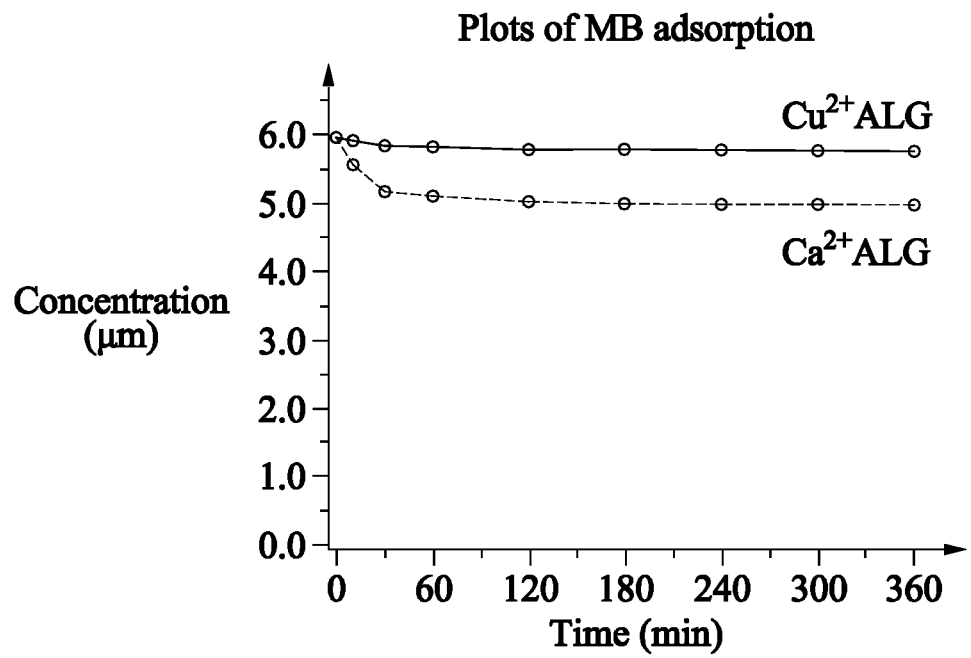
Figure 16D:
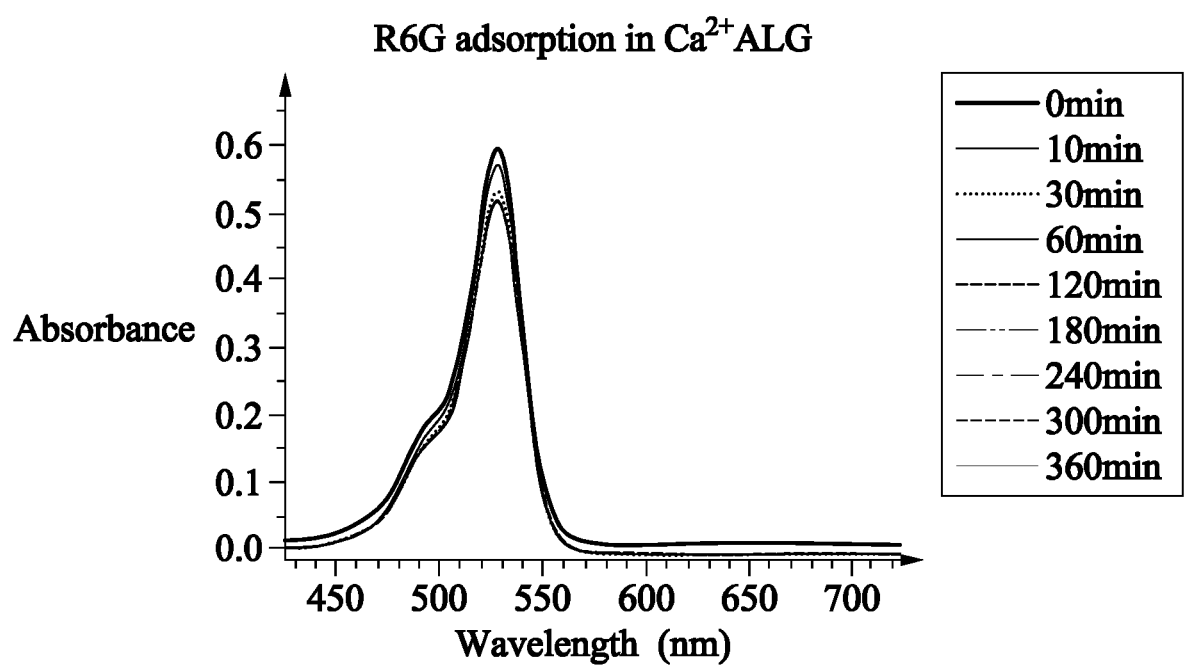
Figure 16E:
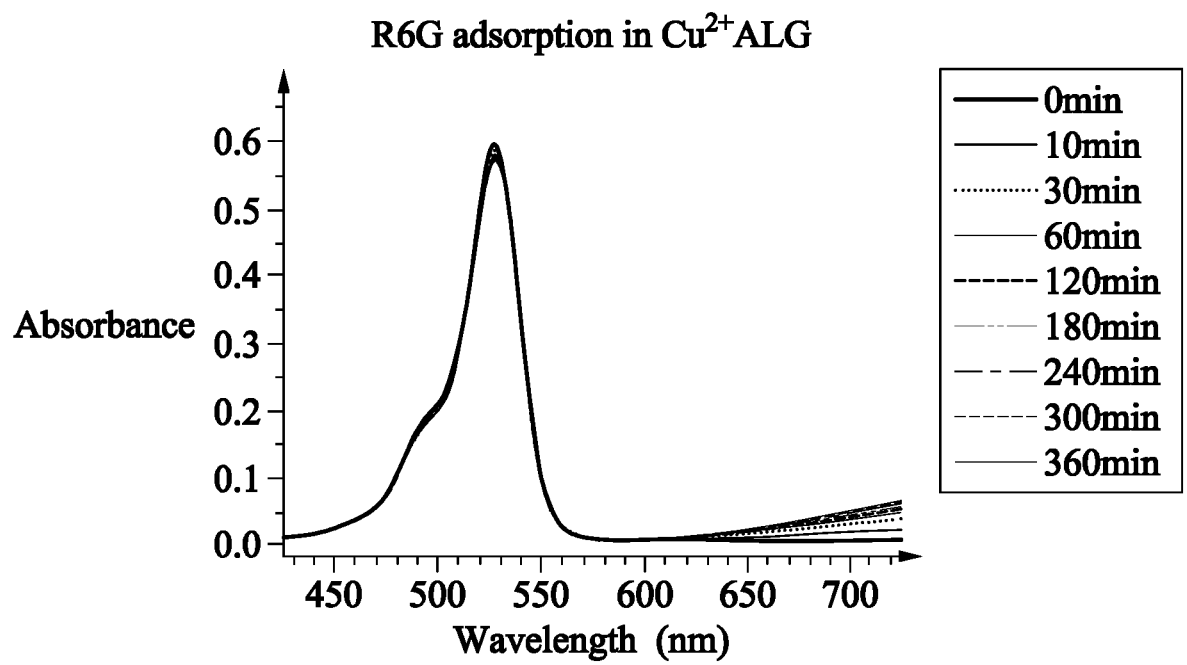
Figure 16F:
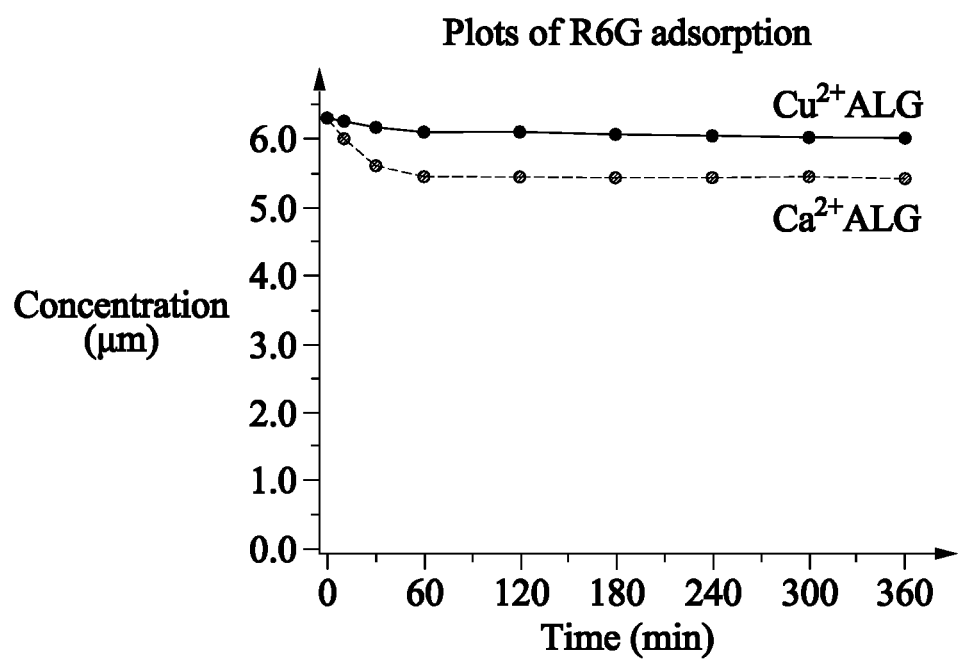
Figure 17A:
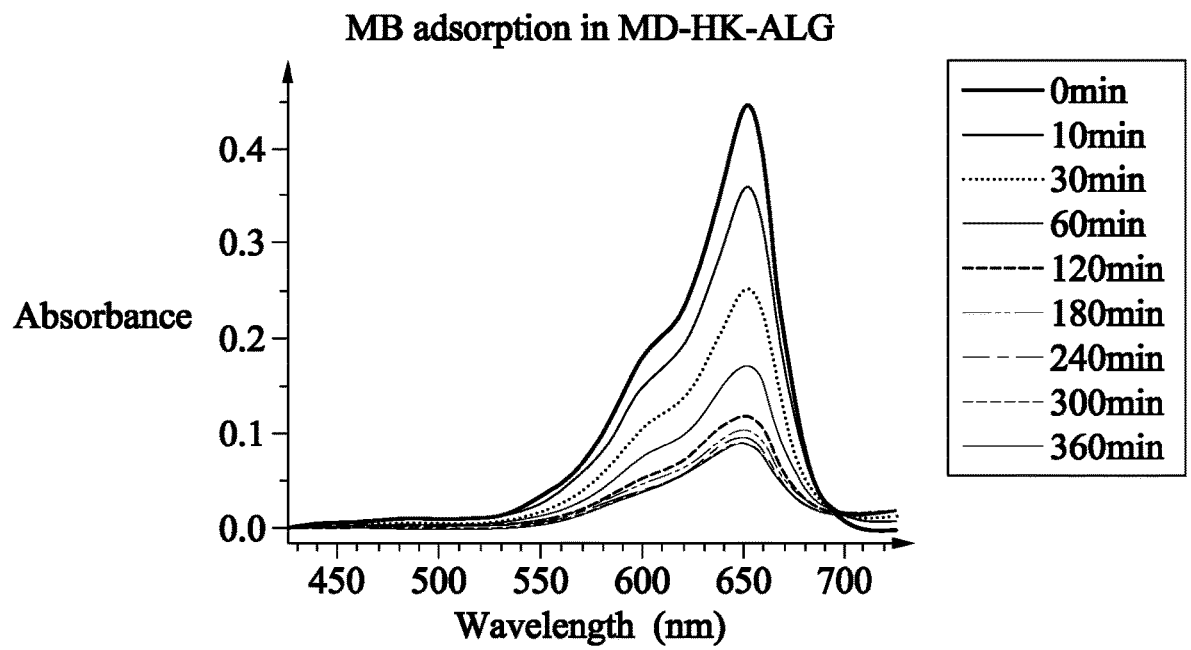
FIGS. 17A through 17I illustrate absorbance of spheres LD-HK-ALG of Comparative Example 1 and spheres MD-HK-ALG of Example 1 with respect to methylene blue and rhodamine 6G.
Figure 17B:
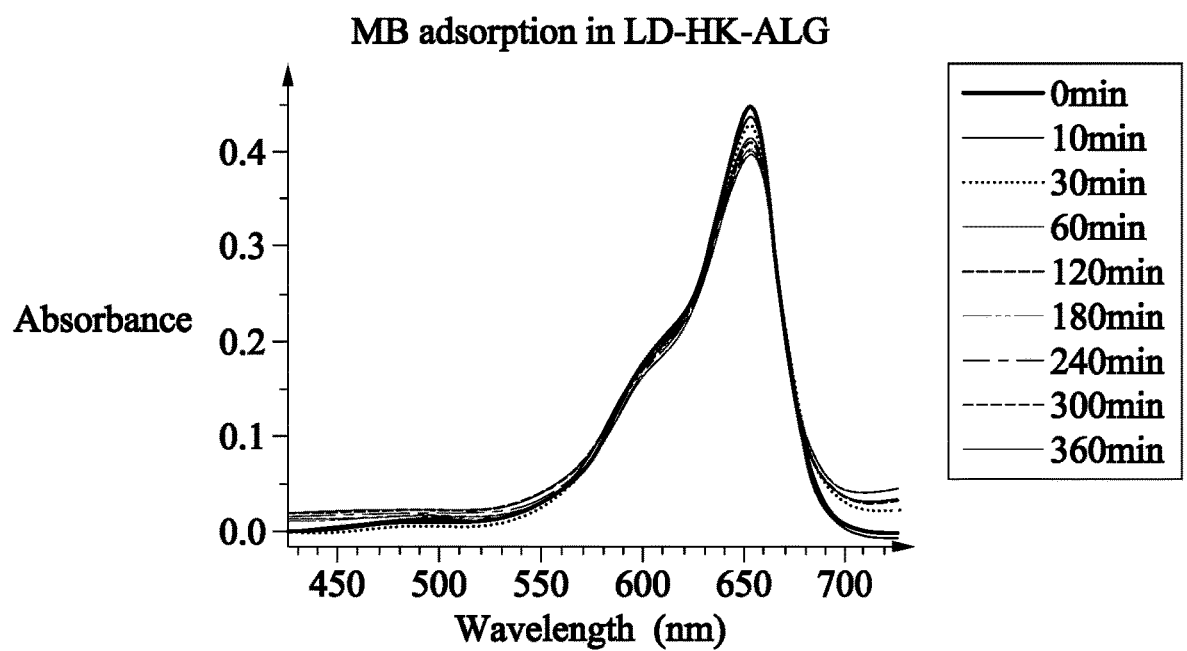
Figure 17C:
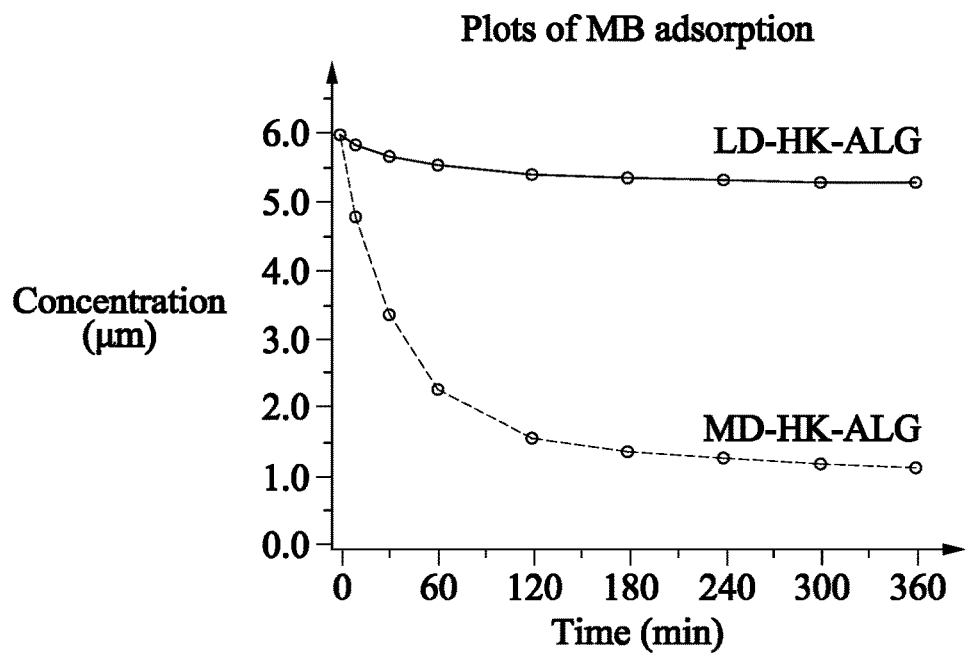
Figure 17D:
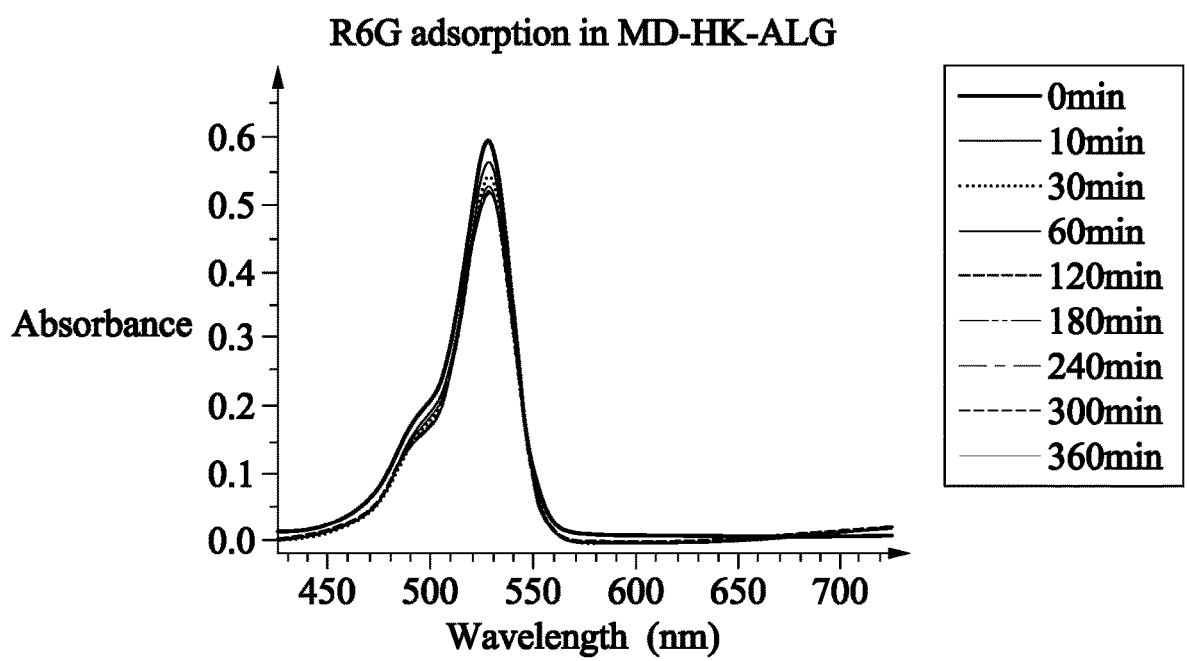
Figure 17E:
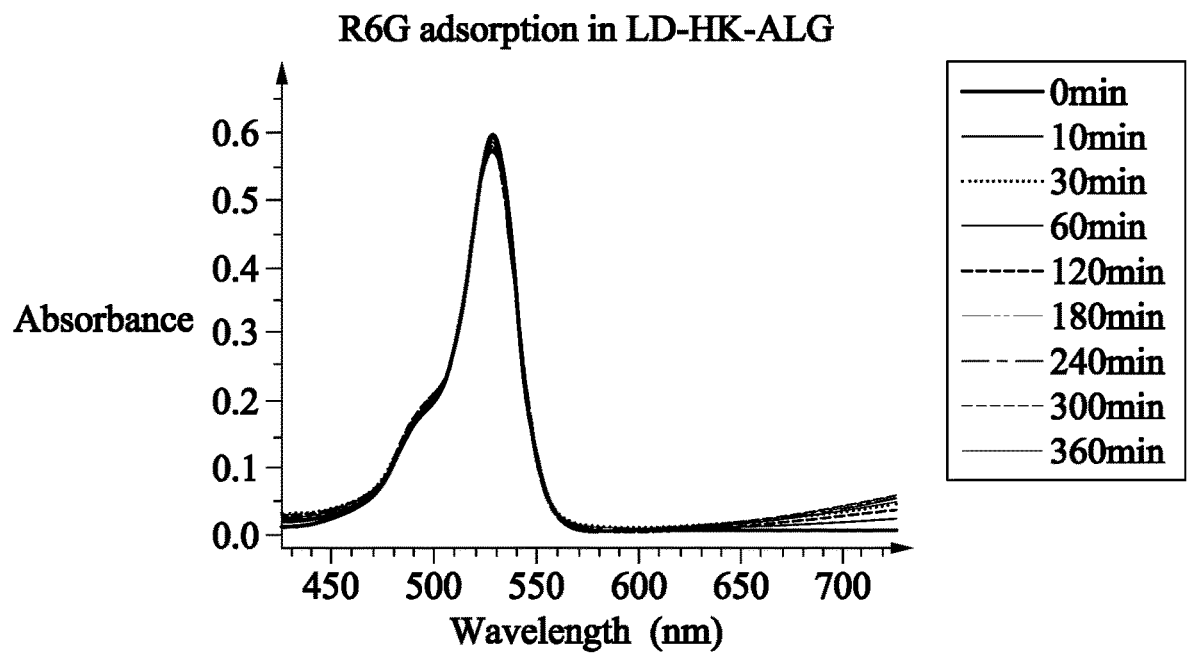
Figure 17F:
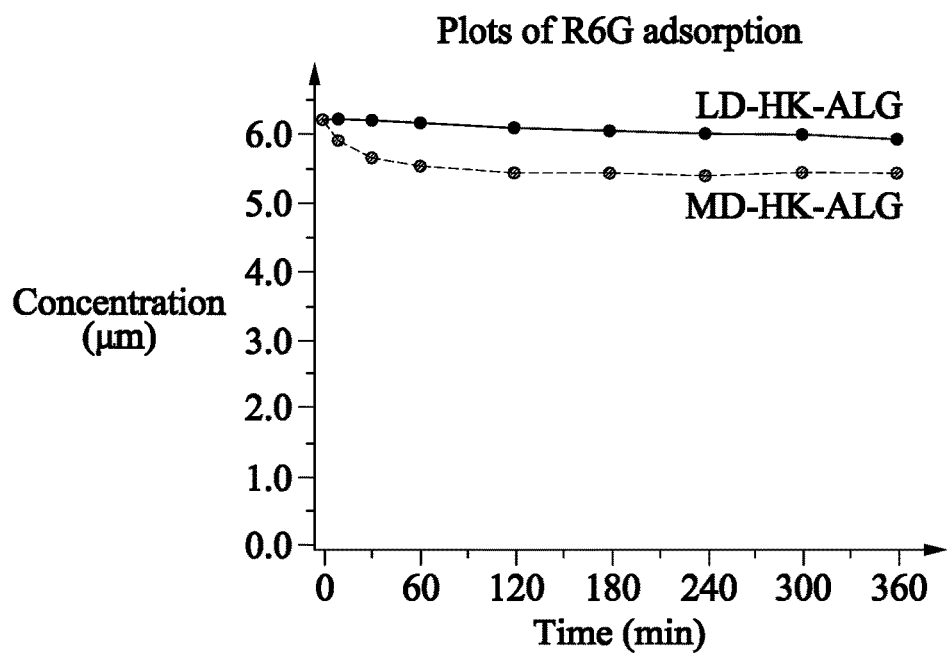
Figure 17G:
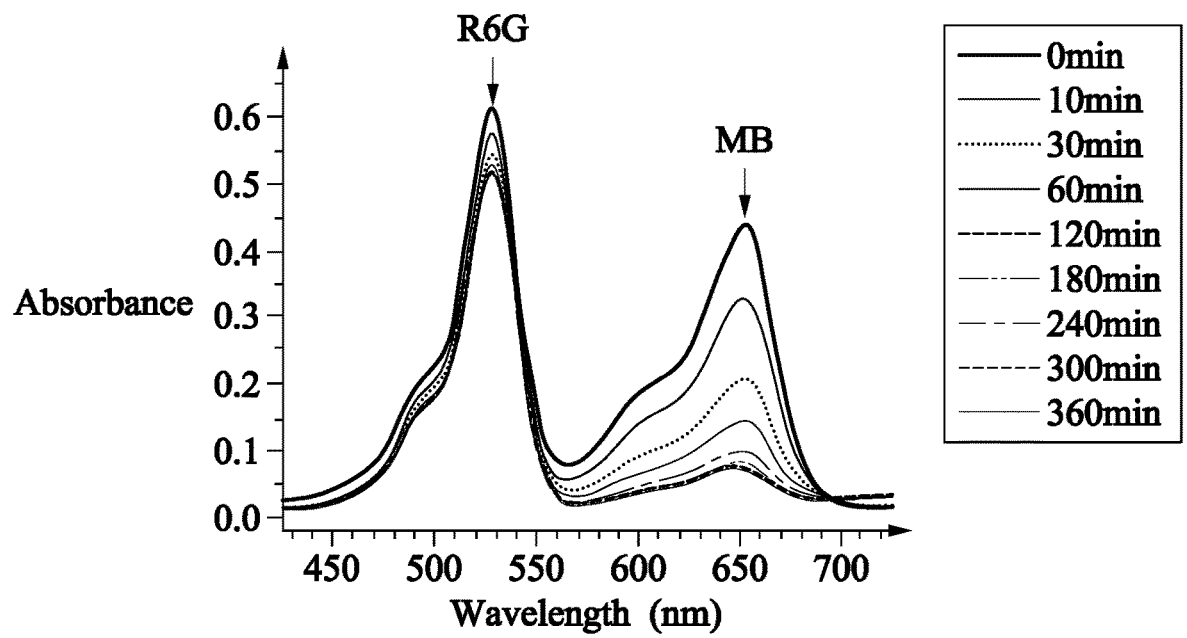
Figure 17H:
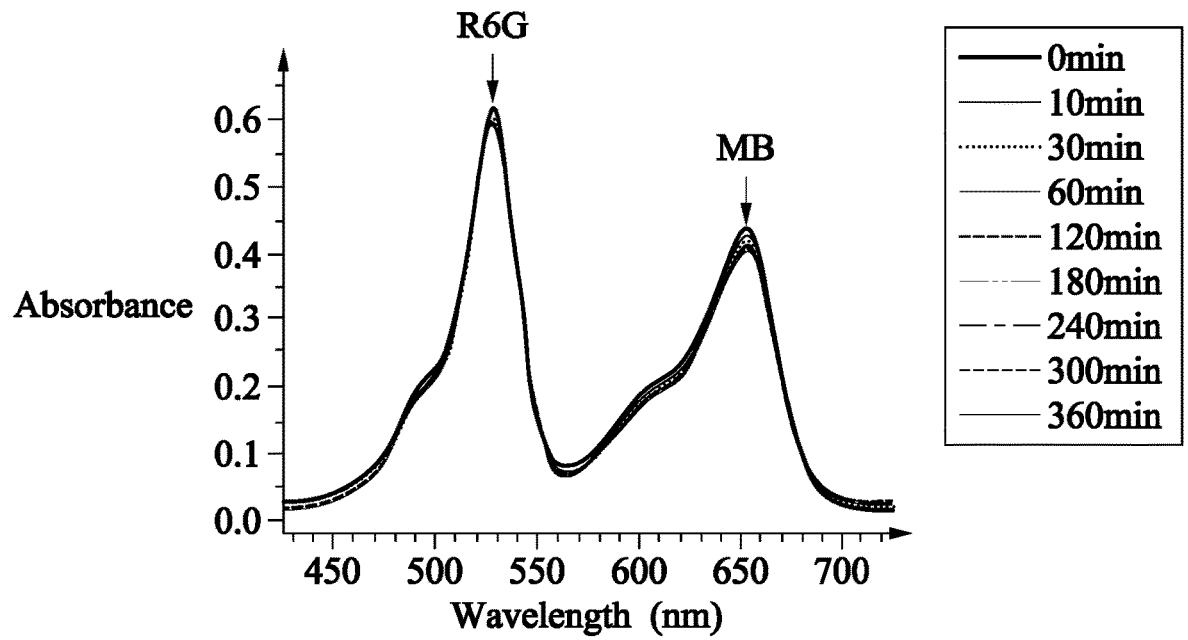
Figure 17I:
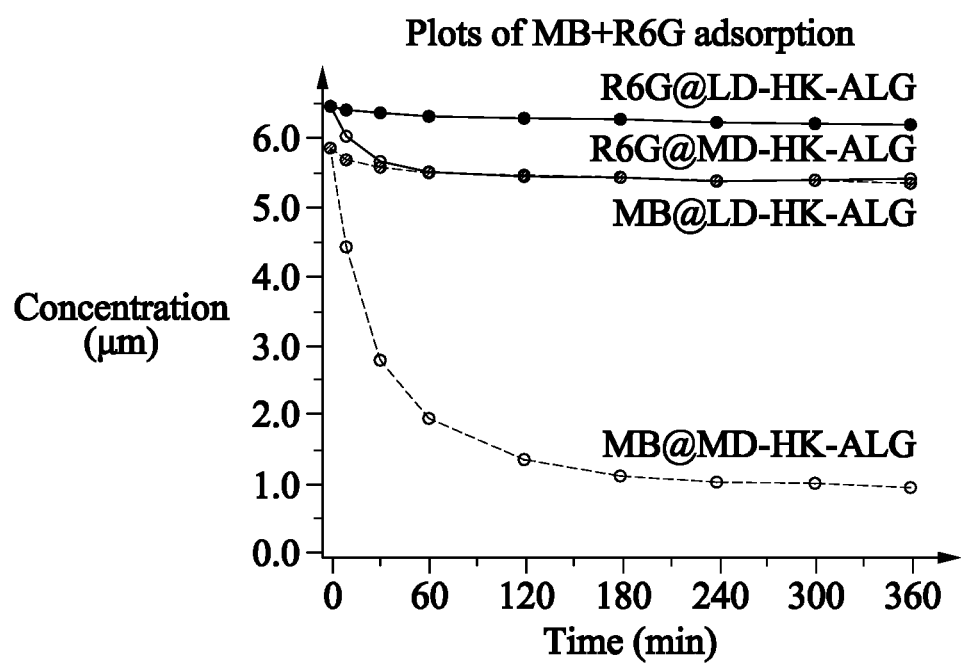

XRD patterns of the spheres prepared in Example 1 and Comparative Example 1 and the spheres prepared in Preparation Example 1 were compared and shown in FIGS. 9 and 10. Also, for comparison, an XRD pattern of each of a state (Cu2+ALG) before ligands were added in Comparative Example 1 and a state (Ca2+ALG) before copper ions were added in Example 1 is shown. Comparing HKUST-1 crystals (HKUST-1 Powder), the matrix of Example 1 showed almost identical patterns, and accordingly it is confirmed that the HKUST-1 crystals were well generated in the matrix prepared by the method according to the present invention. XRD patterns of the membranes prepared in Example 2 and Comparative Example 2 are shown in FIGS. 11 and 12. XRD patterns of the MOF-74(Zn) crystals of Preparation Example 2 and the matrices prepared in Example 3 and Comparative Example 3 are shown in FIG. 13. It is confirmed that crystallinity of MOF crystals generated in the matrices of Examples 2 and 3 are well exhibited.

Experimental Example 3: Ion and Crystal Distribution Analysis for Different Reaction Time of Example 1

To confirm an ion exchange process of a matrix in which metal ions are dispersed, SEM measurements and EDS analysis of 5, 10, 20, 30, and 60 min after a reaction of adding copper ions in Example 1 were performed. It is confirmed that the amount of Ca2+ ions decreased and the amount of Cu2+ increased as the reaction time passed so that ions were well exchanged, and thus it may be found that the HKUST-1 crystals are uniformly generated.

Experimental Example 4: Analysis of Adsorption Characteristics

To confirm a size of an open coordination site and material adsorption characteristics of metal-organic frameworks-containing matrix, adsorption capacities of the matrices of Example 1 and Comparative Example 1 with respect to methylene blue (MB) and rhodamine 6G (R6G) were confirmed.

First, 1.5 mL of 6.0 μM MB/MeOH was placed in a silicone-capped quartz cuvette, and a UV-visible light absorption spectrum was measured.

0.25 g of the spheres LD-HK-ALG of Comparative Example 1, the spheres MD-HK-ALG of Example 1, the spheres Cu2+ALG in which ligands were not added in Comparative Example 1, and the spheres Ca2+ALG in which copper ions were not added in Example 1 were respectively added in the MB solution, followed by immediately measuring of absorption spectra every 5 min, which continued for 6 h.

1.5 mL of 6.0 μM R6G solution was added, and the same experiment as that of MB was repeated.

Absorption spectra of MB and rhodamine 6G are shown in FIGS. 15A through 15D, and absorption coefficients thereof were obtained as 74,760 and 95,270 M-1 cm-1 at 652 and 528 nm, respectively.

Based on this, an absorption spectrum of each of the spheres was analyzed, and it is confirmed that almost no adsorption occurred in the spheres Cu2+ALG in which ligands were not added in Comparative Example 1, and the spheres Ca2+ALG in which copper ions were not added in Example 1 (FIGS. 16A through 16F). In other words, it may be found that absorption of MB and rhodamine 6G hardly occurs in a matrix before MOFs are generated.

Figure 18A:
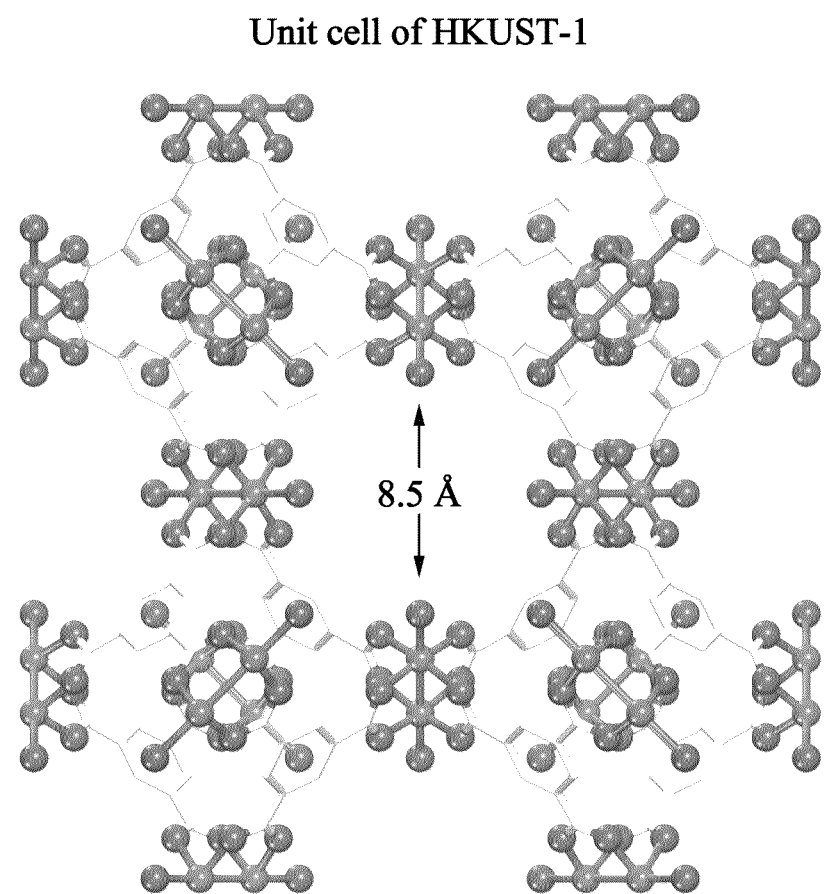
FIG. 18A illustrates a window size of HKUST-1 crystals.
Figure 18B:
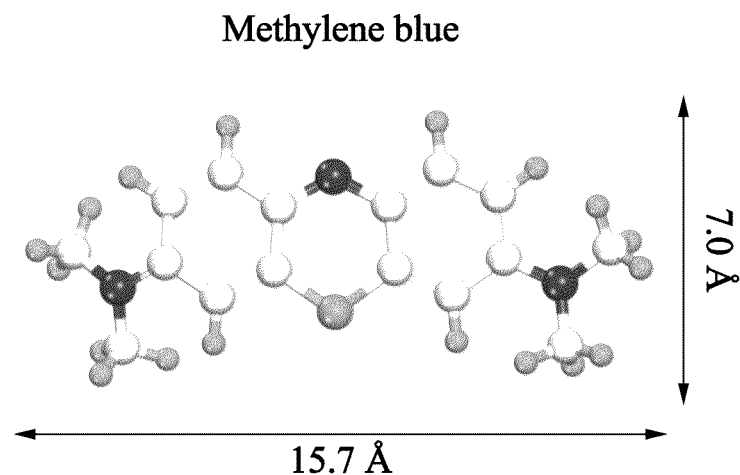
FIG. 18B illustrates a molecular size and a molecular structure of methylene blue.
Figure 18C:
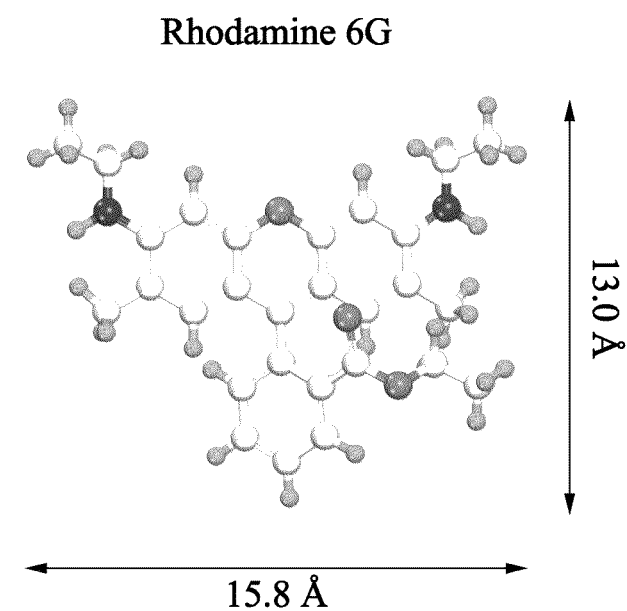
FIG. 18C illustrates a molecular size and a molecular structure of rhodamine 6G.

Referring to absorption spectrum results of the spheres LD-HK-ALG of Comparative Example 1 and the spheres MD-HK-ALG of Example 1, both the spheres LD-HK-ALG and MD-HK-ALG adsorbed MB but did not adsorb rhodamine 6G (FIGS. 17A through 17I). This indicates that HKUST-1 and windows thereof are uniformly generated in the matrices prepared in Example 1 and Comparative Example 1. Specifically, referring to a molecular size of each of MB and rhodamine 6G and a size of the window in the HKUST-1 as shown in FIGS. 18A through 18C, the window in the HKUST-1 has a size of 8.5 Å, so as to adsorb MB (7.0 Å) that is less in size than the window, but it is difficult to adsorb rhodamine 6G (13.0 Å) that is greater in size than the window. Thus, the HKUST-1 may perform selective adsorption based on a molecular size through the window thereof. However, when the HKUST-1 does not uniformly grow, the size of the window may not be uniform, thereby making it difficult to perform the above-described selective adsorption.

It may be found that the matrix of Example 1 prepared according to the present invention was grown as a structure having a uniform window size, and accordingly selective adsorption based on a molecular size is possible.

Figure 19:
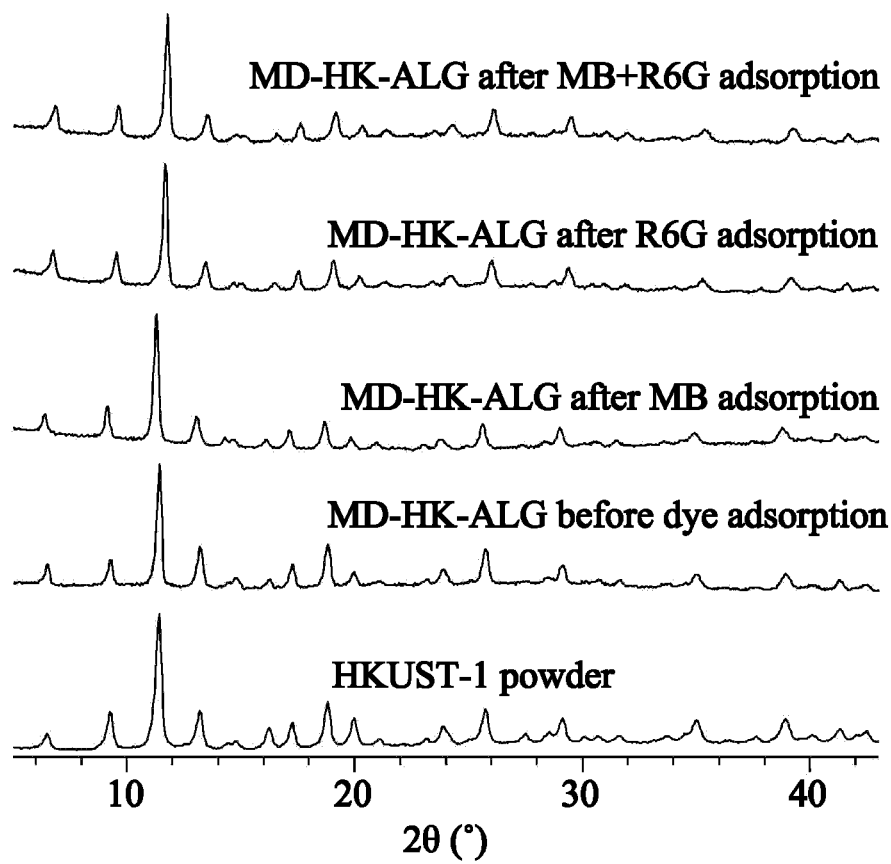
FIG. 19 illustrates results of XRD of HKUST-1 crystals of Preparation Example 1, and spheres of Example 1 before and after adsorption of methylene blue and rhodamine 6G.

XRD patterns before and after adsorption of the spheres of Example 1 were observed (FIG. 19). It may be found that even after the adsorption, HKUST-1 crystals remain unchanged.

Experimental Example 5: TGA

Figure 20A:
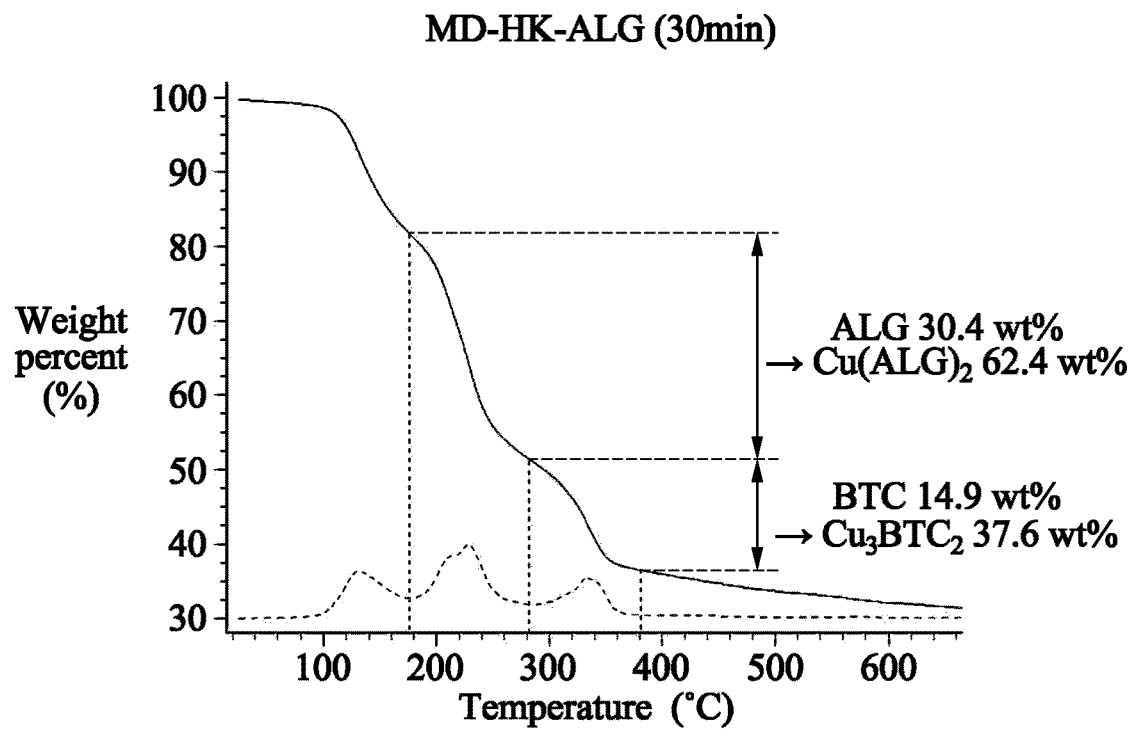
FIGS. 20A and 20B illustrate results of thermogravimetric analysis (TGA) of spheres of Comparative Example 1 and the spheres of Example 1, respectively.
Figure 20B:
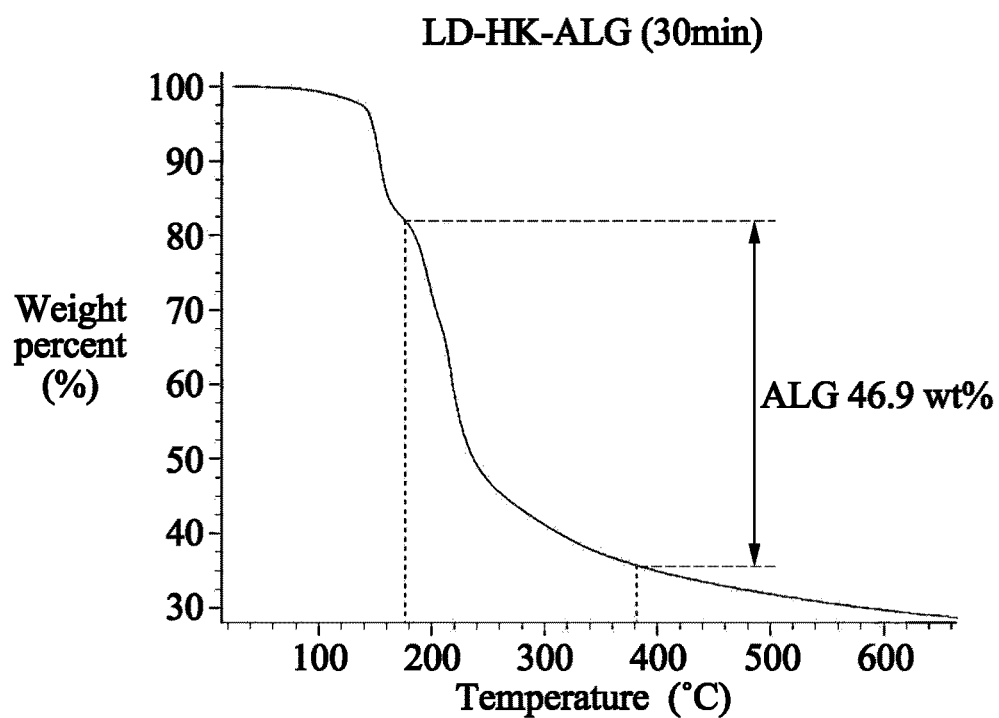

A TGA of each of the spheres of Example 1 and Comparative Example 1 was performed (FIGS. 20A and 20B). Measurements were performed at 30 min after each reaction, and a decomposition temperature of the spheres of Example 1 was in a range of 110 to 175° C., a range of 175 to 285° C., and a range of 285 to 380° C. A first temperature range is caused by evaporation of a solvent, a second temperature range is caused by decomposition of alginate, and a third temperature range is caused by decomposition of HKUST-1 crystals. Based on the above ranges of the decomposition temperature, an amount of HKUST-1 crystals generated may be inferred.

It would be appreciated by those having ordinary knowledge in the art to which the present disclosure pertains that various modifications and variations can be made from the foregoing descriptions without changing technical ideas or essential features of the present disclosure. Therefore, the aforementioned example embodiments are construed as not being restrictive but being illustrative. The scope of the present disclosure is defined by the appended claims, and all variations and modifications made from the meanings and scope of the claims and their equivalents are construed as being included in the scope of the present disclosure.

The invention claimed is:

1. A method for preparing a matrix containing metal-organic frameworks (MOFs), the method comprising steps of:
   1) mixing a liquid organic ligand precursor solution and a liquid anionic polymer-containing solution to produce a mixed solution, the organic ligand precursor and the anionic polymer being dissolved in the mixed solution; and
   2) adding a metal salt to the mixed solution to form the MOFs in the matrix,
   wherein the MOFs are uniformly dispersed in the matrix; and
   wherein the MOFs and the polymer in the matrix are adhered to each other.

2. The method of claim 1, wherein step 1) further comprises step 1-1) of adding a crosslinkable metal salt to the mixed solution, forming at least one solid, the at least one solid being the matrix throughout.

3. The method of claim 2, wherein adding the crosslinkable metal salt forms at least one solid with the anionic polymer and the organic ligand, the at least one solid being the matrix throughout.

4. The method of claim 1, further comprising, before step 1):
   step 1-0) of mixing the anionic polymer and a flexible polymer to produce an anionic polymer-containing solution.

5. The method of claim 1, wherein the MOFs have windows formed inside the MOFs wherein the windows have a uniform window size.

6. The method of claim 1, wherein the matrix comprises 10 to 50% by weight (wt %) of MOFs based on a total weight of the matrix.

7. The method of claim 1, wherein the anionic polymer is at least one selected from the group consisting of alginate, carboxymethyl cellulose, hyaluronic acid, poly(acrylic acid) (PA) and its derivatives, poly(methyl acrylate) (PMA) and its derivatives, poly(thiophene acetic acid) and its derivatives, poly(sulfonate styrene) (PSS) and its derivatives, and a combination thereof.

8. The method of claim 7, wherein the anionic polymer is alginate.

9. The method of claim 1, wherein the anionic polymer is a substitute polymer having anionic properties.

10. The method of claim 9, wherein the substitute polymer is an anionic cellulose microfiber.

11. The method of claim 1, wherein the metal salt of step 2) is derived from at least one metal selected from the group consisting of copper (Cu), zinc (Zn), iron (Fe), nickel (Ni), zirconium (Zr), chromium (Cr), scandium (Sc), cobalt (Co), titanium (Ti), manganese (Mn), vanadium (V), aluminum (Al), magnesium (Mg), gallium (Ga), indium (In), yttrium (Y), niobium (Nb), molybdenum (Mo), technetium (Tc), ruthenium (Ru), rhodium (Rh), palladium (Pd), silver (Ag) and cadmium (Cd).

12. The method of claim 1, wherein the organic ligand precursor solution comprises a weak basic material having a $pK_b$ value of 3 to 6.

13. A matrix containing metal-organic frameworks (MOFs), prepared by the method of claim 1,
   wherein the MOFs are uniformly dispersed in the matrix; and
   wherein the MOFs and the polymer in the matrix are adhered to each other.

14. An adsorbent comprising the matrix containing MOFs of claim 13.

15. A method for separating first fluid having a first single molecule size V1 or second fluid having a second single molecule size V2 from a fluid mixture comprising the first fluid and the second fluid (provided that V1≠V2), the method comprising the step of:
   passing the fluid mixture through the matrix containing metal-organic frameworks (MOFs) prepared by the method of claim 13,
   wherein the MOFs have adsorption property or a window size that allows the first fluid to pass and does not allow the second fluid to pass therethrough.

* * * * *